United States Patent
Fukuta et al.

(10) Patent No.: US 8,270,098 B2
(45) Date of Patent: Sep. 18, 2012

(54) IMAGE PICKUP LENS, IMAGE PICKUP APPARATUS, MOBILE TERMINAL, AND METHOD FOR MANUFACTURING IMAGE PICKUP LENS

(75) Inventors: Yasunari Fukuta, Hachioji (JP); Keiji Matsusaka, Osaka (JP)

(73) Assignee: Konica Minolto Opto, Inc., Tokyo (JP)

( * ) Notice: Subject to any disclaimer, the term of this patent is extended or adjusted under 35 U.S.C. 154(b) by 140 days.

(21) Appl. No.: 12/867,974

(22) PCT Filed: Feb. 19, 2009

(86) PCT No.: PCT/JP2009/052864
§ 371 (c)(1),
(2), (4) Date: Aug. 17, 2010

(87) PCT Pub. No.: WO2009/104669
PCT Pub. Date: Aug. 27, 2009

(65) Prior Publication Data
US 2010/0315724 A1    Dec. 16, 2010

(30) Foreign Application Priority Data
Feb. 20, 2008  (JP) ................. 2008-038864

(51) Int. Cl.
*G02B 9/12* (2006.01)
(52) U.S. Cl. ...................... 359/784; 359/716
(58) Field of Classification Search .......... 359/713–716, 359/754–758, 763–766, 771–778, 784–788
See application file for complete search history.

(56) References Cited

U.S. PATENT DOCUMENTS

| | | | |
|---|---|---|---|
| 2006/0044450 A1 | 3/2006 | Wolterink et al. | 348/340 |
| 2007/0070527 A1 | 3/2007 | Sato | 359/784 |
| 2007/0275505 A1 | 11/2007 | Wolterink et al. | 438/118 |
| 2011/0001865 A1* | 1/2011 | Hirao et al. | 348/335 |

FOREIGN PATENT DOCUMENTS

| | | |
|---|---|---|
| CN | 1682377 A | 10/2005 |
| CN | 1940625 A | 4/2007 |
| EP | 1543564 A | 6/2005 |
| EP | 1770422 A1 | 4/2007 |

(Continued)

OTHER PUBLICATIONS

Office Action dated Dec. 12, 2011 in Chinese Patent Application No. 2009-80105484.3.

*Primary Examiner* — Darryl J Collins
(74) *Attorney, Agent, or Firm* — Cozen O'Connor

(57) ABSTRACT

Disclosed is an image pickup lens (LN) including at least three lens blocks (BK) each equipped with a lens substrate (LS) being a parallel flat plate, and a lens or lenses (L) having a positive or negative power and being connected to at least one of an object-side surface and an image-side surface of the lens substrate (LS). In the image pickup lens (LN), a first lens block (BK1) arranged at a closest position to an object side has a positive powder, a second lens block (BK2) arranged at an image side of the first lens block (BK1) has s negative power, and predetermined conditional expressions are satisfied, whereby the image pickup lens capable of being easily produced at a low cost and having a high performance and a compact size can be provided.

18 Claims, 18 Drawing Sheets

FOREIGN PATENT DOCUMENTS

| | | |
|---|---|---|
| JP | 2005-539276 A | 12/2005 |
| JP | 2006-323365 A | 11/2006 |
| JP | 2007-94114 A | 4/2007 |
| JP | 2007-127953 A | 5/2007 |
| JP | 3929479 B1 | 6/2007 |
| JP | 3946245 B1 | 7/2007 |
| JP | 2007-206611 A | 8/2007 |
| JP | 3976781 B1 | 9/2007 |
| JP | 3976782 B1 | 9/2007 |
| JP | 2007-298719 A | 11/2007 |
| JP | 2008-287007 A | 11/2008 |
| KR | 10-2007-0036674 A | 4/2007 |
| KR | 10-2007-0089889 A | 9/2007 |
| KR | 10-2007-0096020 A | 10/2007 |
| WO | WO 2004/027880 A2 | 4/2004 |
| WO | WO 2008/011003 A2 | 1/2008 |
| WO | WO 2008/142809 A1 | 11/2008 |
| WO | WO 2009/104669 A1 | 8/2009 |

* cited by examiner

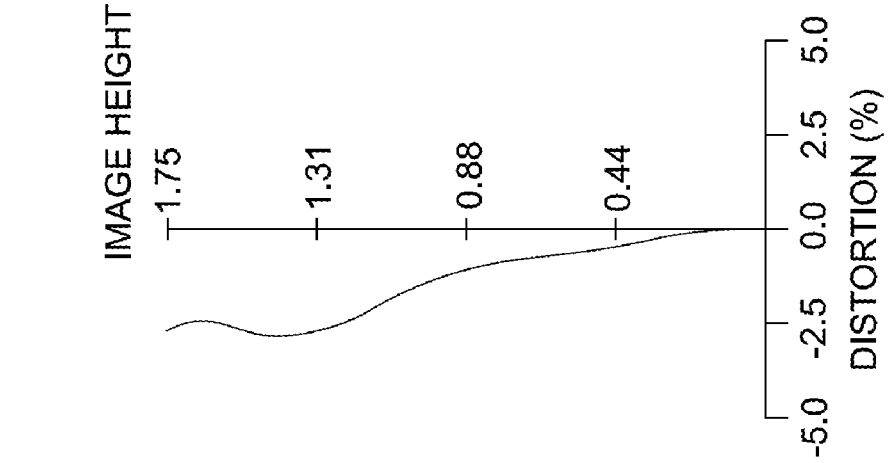
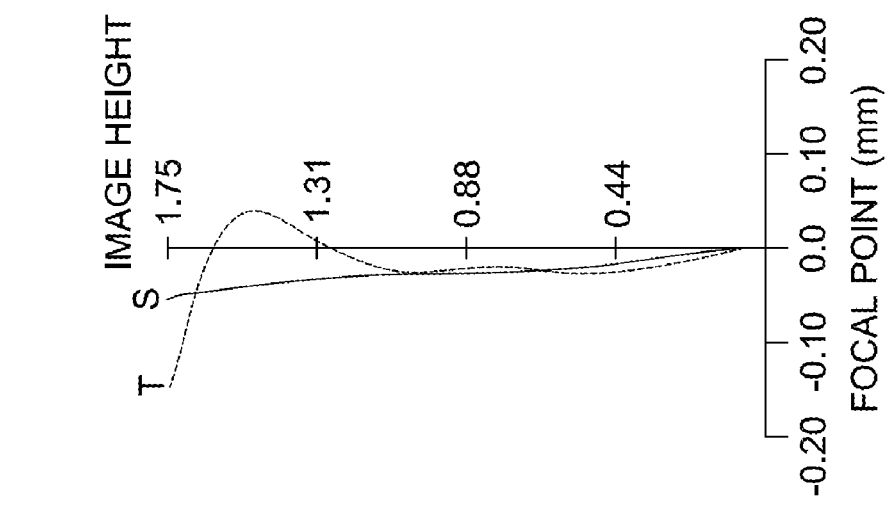

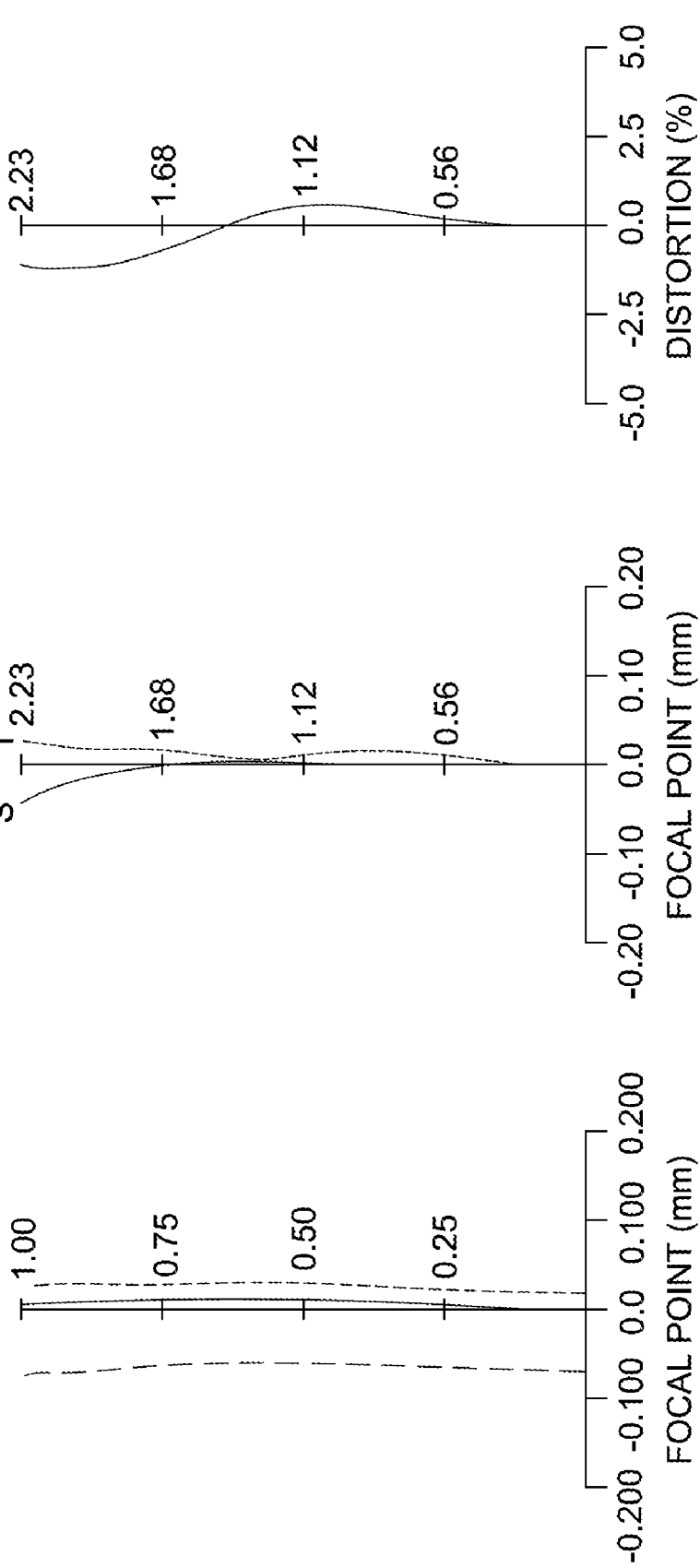
FIG. 10A SPHERICAL ABERRATION
FIG. 10B ASTIGMATISM
FIG. 10C DISTORTION

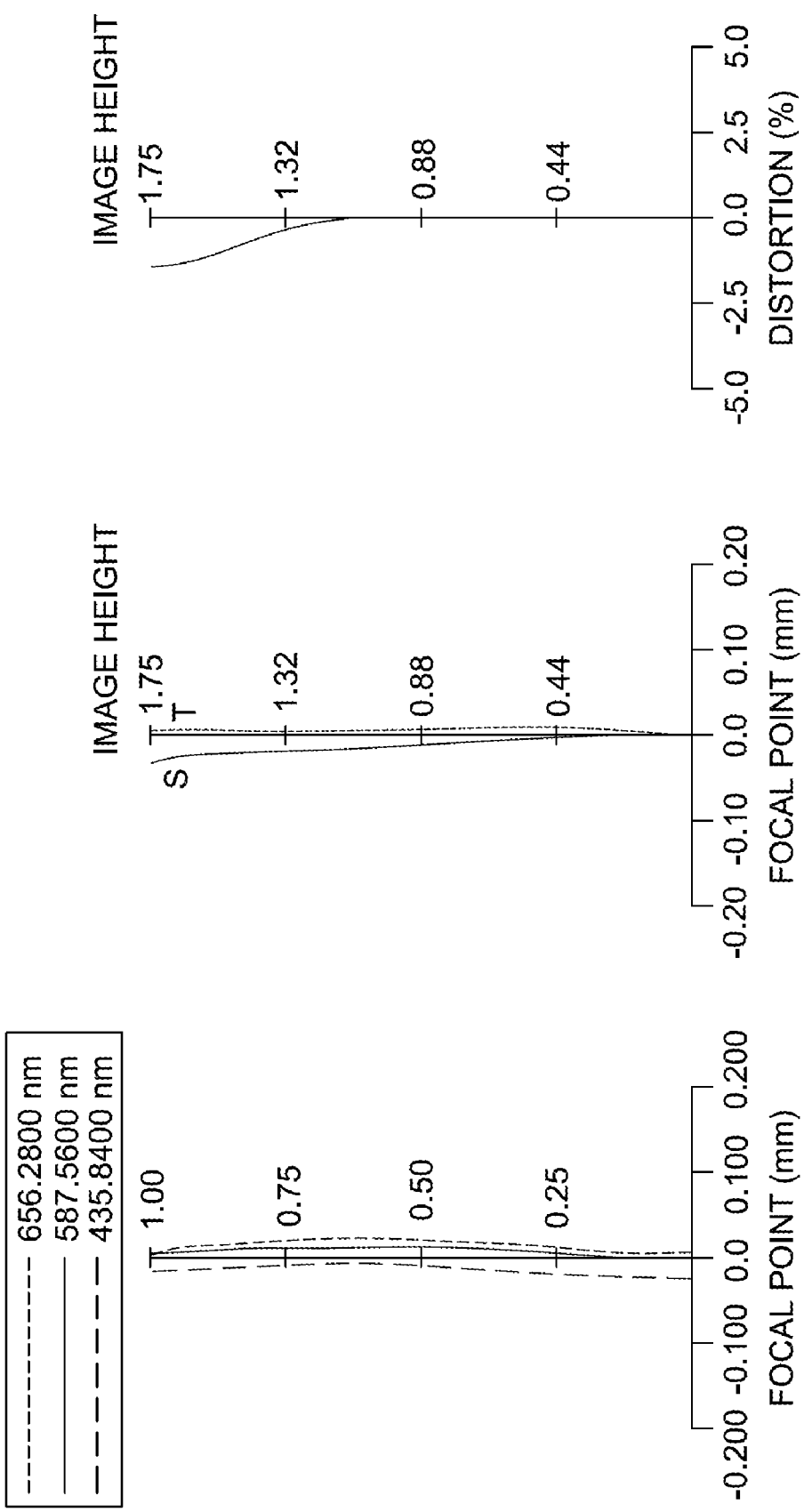

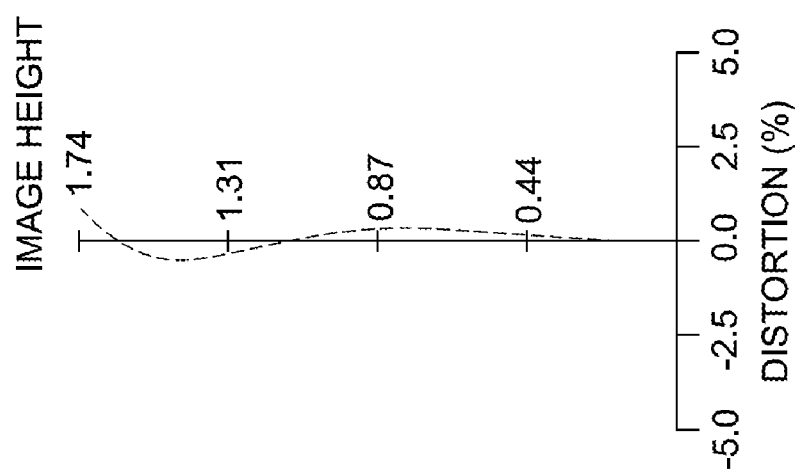
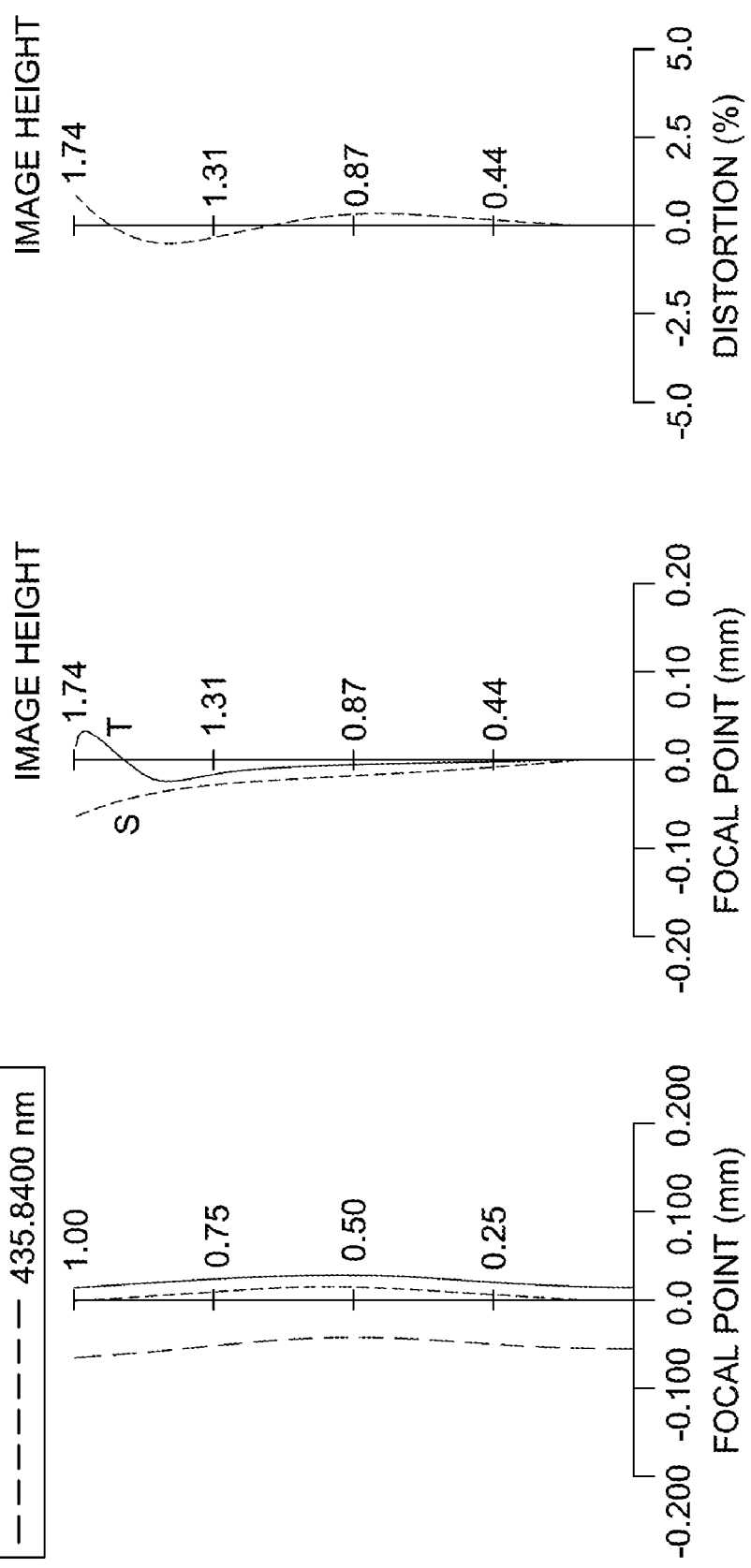

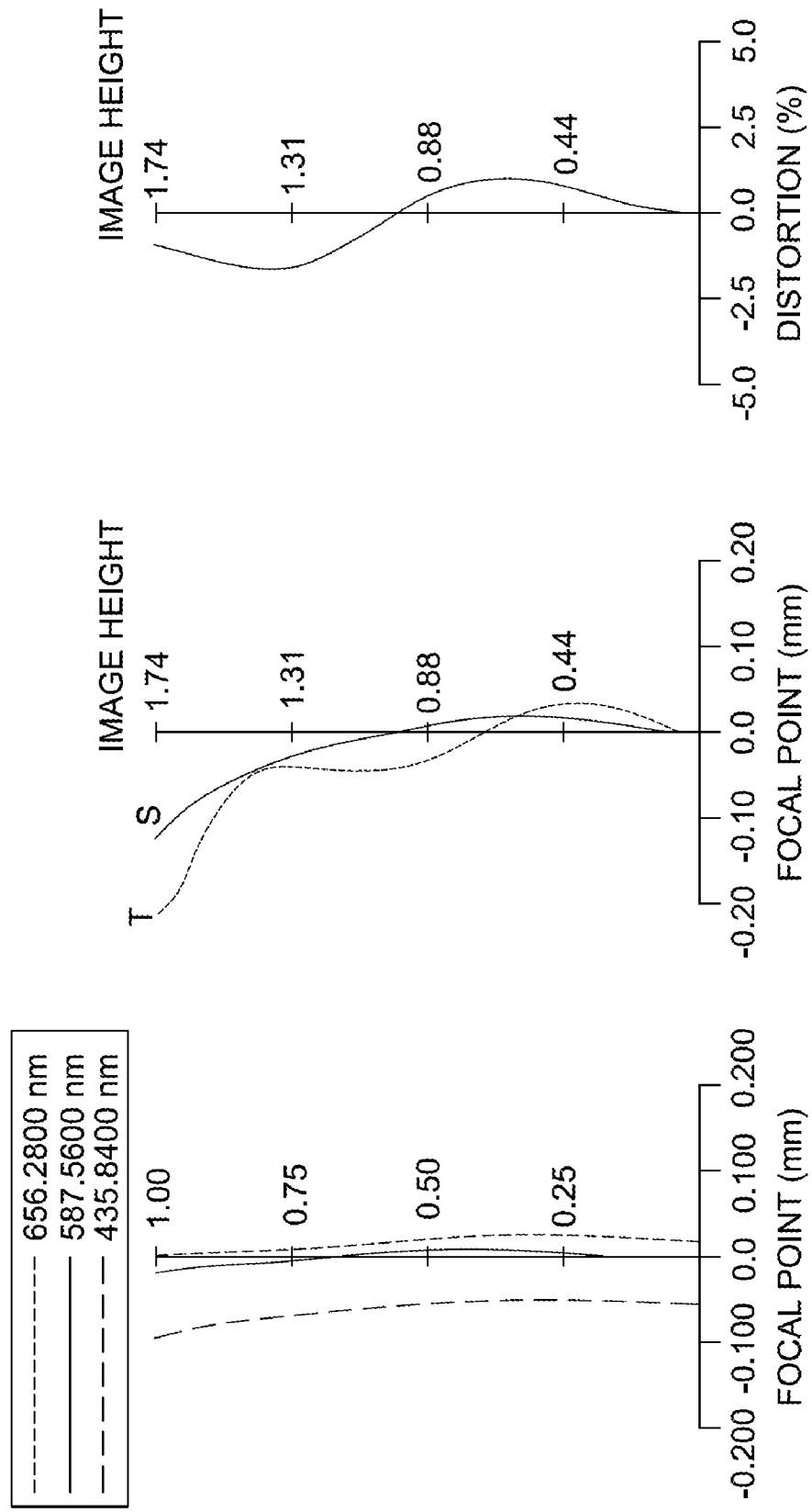

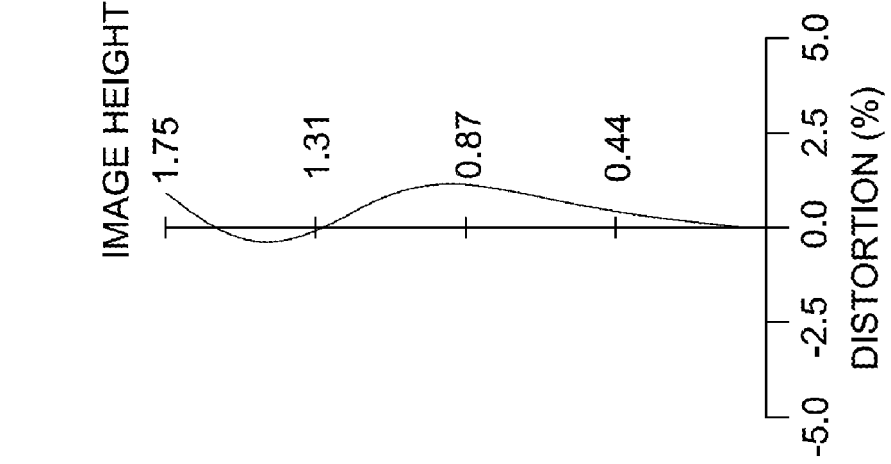
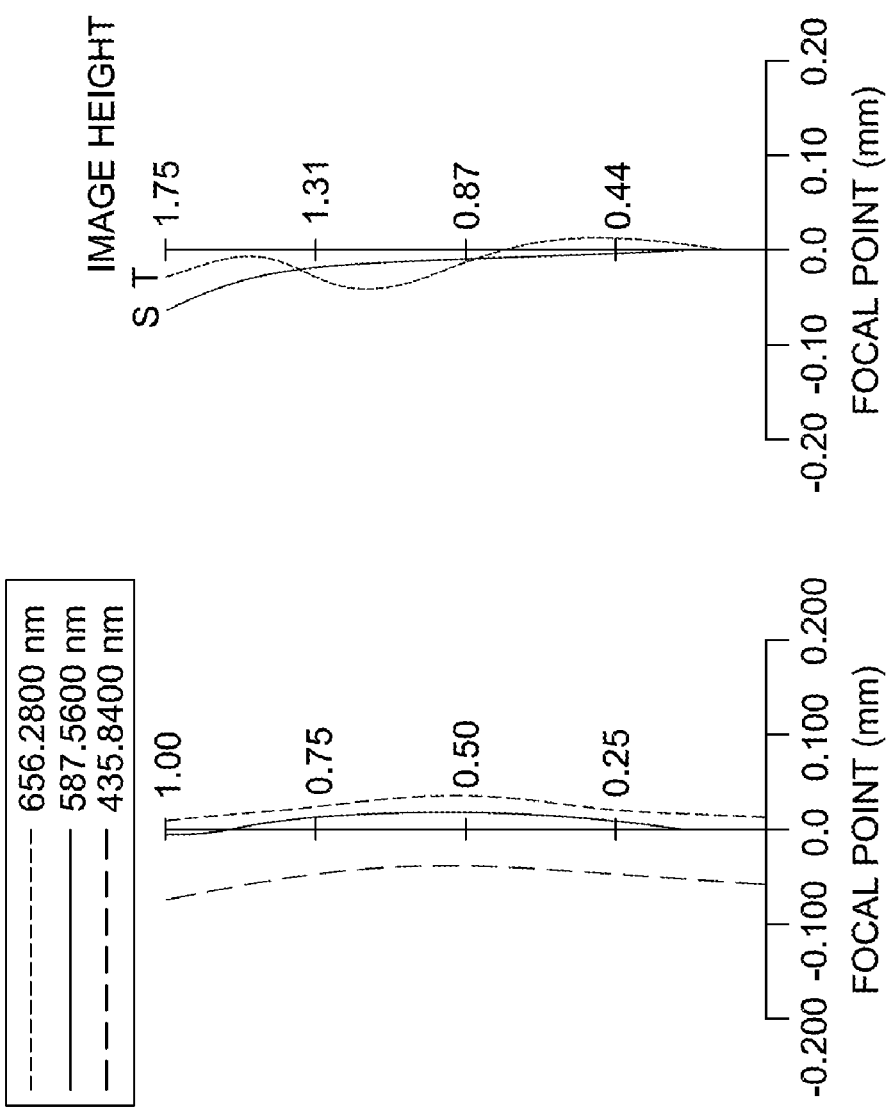

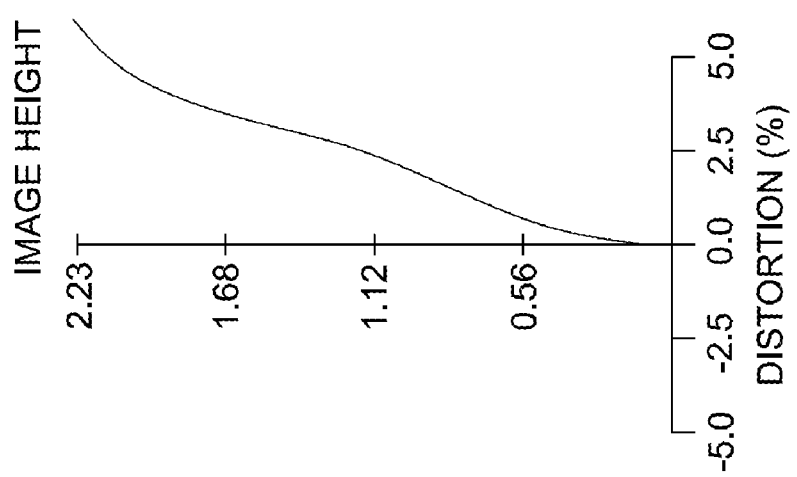
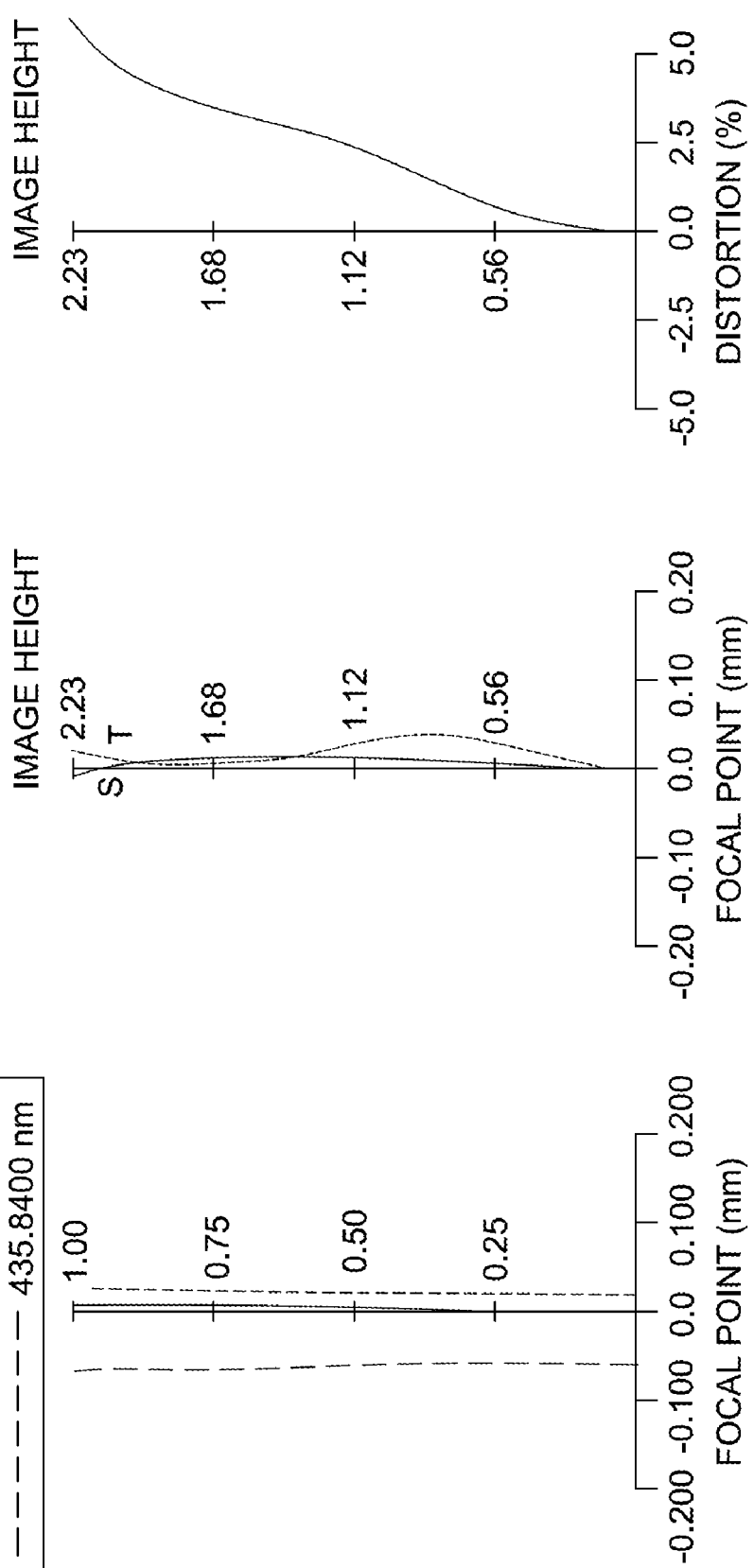

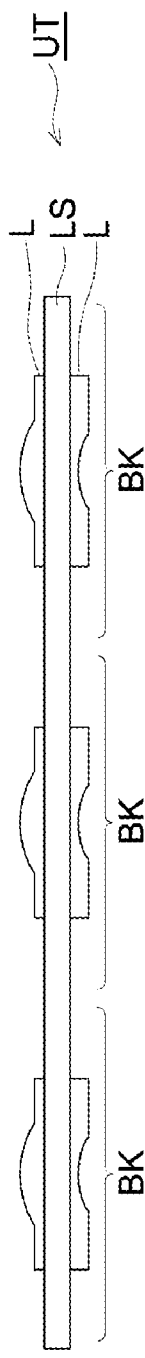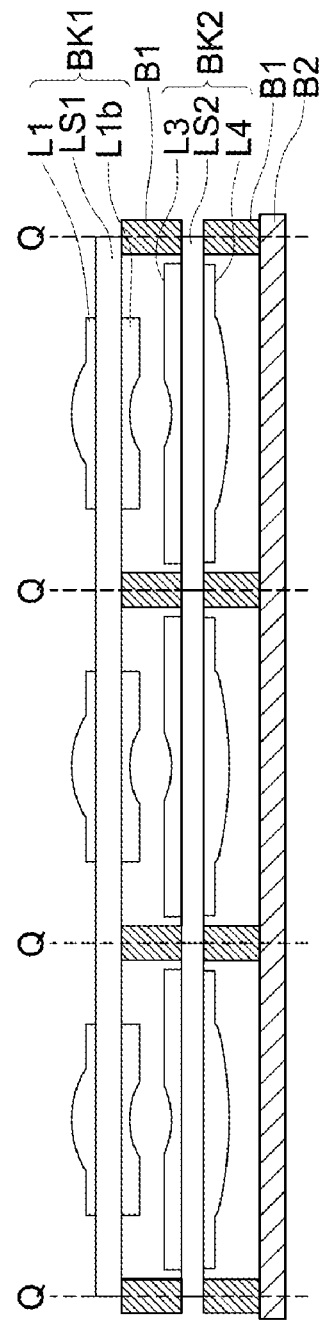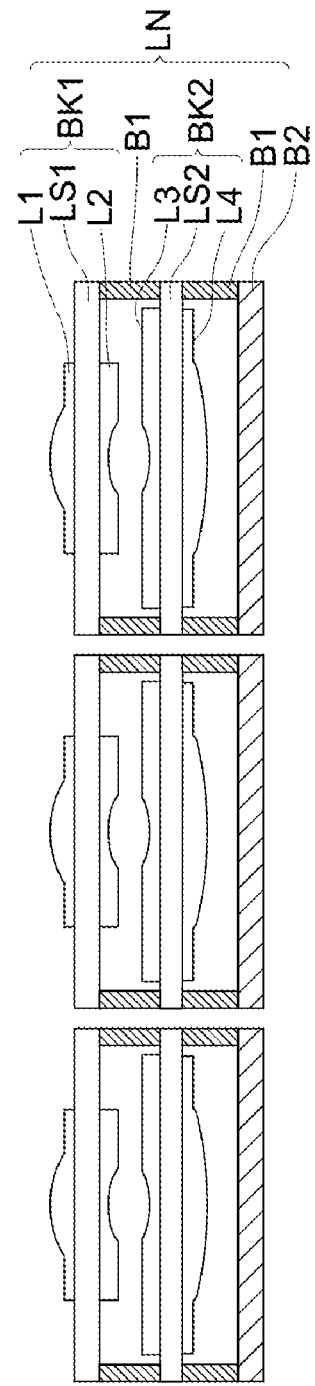
FIG. 18A
FIG. 18B
FIG. 18C

IMAGE PICKUP LENS, IMAGE PICKUP APPARATUS, MOBILE TERMINAL, AND METHOD FOR MANUFACTURING IMAGE PICKUP LENS

RELATED APPLICATIONS

This application is a U.S. National Phase Application under 35 U.S.C. 371 of International Application No. PCT/JP2009/052864, filed with Japenese Patent Office on Feb. 19, 2009, which claims priority to Japanese Patent Application No. 2008-038864, filed Feb. 20, 2008.

TECHNICAL FIELD

The present invention relates to an image pickup lens, an image pickup apparatus, a mobile terminal, and a method for manufacturing the image pickup lens.

BACKGROUND ART

Recently, a compact and thin-type image pickup apparatus has come to be mounted on a mobile terminal representing a compact and thin-type electronic hardware such as a cell phone and PDA (Personal Digital Assistant). Information such as voice information and image information is transmitted mutually between such the mobile terminal and, for example, an electronic device at a remote location.

As image pickup elements used for these image pickup apparatuses, a solid-state image pickup element such as an image sensor of a CCD (Charge Coupled Device) type and an image sensor of a CMOS (Complimentary Metal-Oxide Semiconductor) type has been used. In recent years, as a lens tor forming an image of a photographic subject on the image pickup element, a lens made of resin that is suitable for mass production has come to be used for further cost reduction.

As such the image pickup lens, especially as an image pickup lens used for an image pickup apparatus (so-called a camera module) housed in a mobile terminal, an optical system of a three-element structure including three plastic lenses and an optical system of a three-element structure including one glass lens and two plastic lenses are widely known. However, demands of further compactness and mass productivity for these image pickup lenses are difficult to be compatible because of their technical limits.

As one of methods to solve the above problem, there has been proposed a replica method in Patent Literature 1. A replica method is a method to form plural lenses (lens elements) on one lens plate (water) simultaneously. Patent Literature 1 discloses an image pickup lens including a junction-type complex lens (lens block) made by the replica method. Patent Literatures 2 to 5 also disclose image pickup lenses each including the lens block.

Patent Literature 1: JP-A No. 2006-323365
Patent Literature 2: JP-B No. 3929479
Patent Literature 3: JP-B No. 3976781
Patent Literature 4: JP-B No. 3946245
Patent Literature 5: JP-B No. 3976782

DISCLOSURE OF INVENTION

Problems to be Solved by the Present Invention

However, the image pickup lens disclosed in Patent Literature 1 includes a diffractive surface. Therefore, manufacturing the image pickup lens causes great difficulty. Further, it causes problems of deterioration of diffraction efficiency for a light flux with a wavelength other than a manufacturing wavelength and of ghost caused due to a diffracted light flux with unwanted diffraction order.

An image pickup lens disclosed in Patent Literatures 2 and 3 includes just two lens blocks. It has no choice but to exhibit low aberration-correcting ability, and hardly handles an image pickup element with the greater number of pixels.

On the other hand, an image pickup lens disclosed in Patent Literatures 4 and 5 includes three lens blocks. However, the lens block at the closest position to the object has excessively strong power. Therefore, when the lens block has slight manufacturing error, the optical property of the total image pickup lens (ability to guide an optical image with high quality to an image pickup element) is significantly deteriorated. Therefore, it is difficult to mass-produce such the image pickup lenses.

Recently, a camera module is mounted on a printed board as follows. The camera module is arranged together with IC (Integrated Circuit) chips on a printed board on which a paste solder has been printed, then, is subjected to heat treatment (reflow processing), to be mounted on the printed board. This mounting process is employed to manufacture a great number of various apparatuses each including the camera module at low cost. Therefore, recent image pickup lenses are also demanded to have heat resistance to withstand the reflow processing.

The present invention has been achieved with considering the above situation. An object of the present invention is to provide an image pickup lens satisfying the followings.

Shortening the total optical length as compared with the image height, without including a diffractive surface
Securing an excellent aberration-correction property
Controlling a sensitivity of manufacturing error
Saving cost

Means to Solve the Problems

An image pickup lens comprises at least three leas blocks. Each of the lens blocks comprises: a lens substrate which is a parallel flat plate; and a lens or lenses, having a positive or negative power. The lens or lenses are connected to at least one of an object-side surface and an image-side surface of the lens substrate.

The lens blocks included in the image pickup lens are numbered as first, second, and third, in order from the object side to the image side. Similarly, substrates included in the image pickup lens are numbered as first, second, and third, in order from the object side to the image side. Lenses L in the lens blocks are represented as lens L[LS1o], lens L[LS1m], lens L[LS2o], lens L[LS2m], lens L[LS3o], and lens L[LS3m], each of which means lens L at the object side (o) on lens substrate LS (first les substrate LS1 and second lens substrate LS2) or lens L at the image side (m) on lens substrate LS (first les substrate LS1 and second lens substrate LS2).

In the above image pickup lens has the following features. The lens or lenses included in each of the lens blocks, is formed of a different material from the lens substrate. The first lens block has a positive power, and the second lens block has a negative power. Further, the image pickup lens satisfies the following expression (G1).

$$0.7 < f[BK1]/f[\text{all}] < 1.0 \tag{G1}$$

In the expression, f[BK1] is a composite focal length of the first lens block, and f[all] is a composite focal length of a total system of the image pickup lens.

In the image pickup lens, the first lens block preferably includes a first lens substrate, a lens L[LS1o] connected to an object-side surface of the first lens substrate, and a lens L[LS1m] connected to an image-side surface of the first lens substrate. Further, the image pickup lens preferably satisfies the following expression (G2).

$$1.0 < (r[L[LS1m]m] + r[L[LS1o]o])/(r[L[LS1m]m] - r[L[LS1o]o]) < 4.0 \quad (G2)$$

In the expression, r[L[LS1m]m] is a curvature radius of an image-side lens surface of the lens L[LS1m], and r[L[LS1o]o] is a curvature radius of an object-side surface of the lens L[LS1o].

In the image pickup lens, the first lens block preferably includes a first lens substrate, and a lens L[LSo] connected to an object-side surface of the first lens substrate. Further, the image pickup lens preferably satisfies the following expression (G3).

$$40 < \nu[L[LS1o]o] \quad (G3)$$

In the expression, $\nu[L[LS1o]o]$ is an Abbe number of the lens L[LS1o].

The image pickup lens preferably satisfies the following expression (G5).

$$0.2 < |f[BK1]/f[BK2]| < 0.6 \quad (G5)$$

In the expression, f[BK1] is a composite focal length of the first lens block, and f[BK2] is a composite focal length of the second lens block.

In the image pickup lens, the second lens block preferably includes a second lens substrate, and a lens L[LS2o] connected to an object-side surface of the second lens substrate. Further, an object-side surface of the lens L[LS2o] is a concave surface facing the object side, and the image pickup lens preferably satisfies the following expression (G6)

$$0.4 < |r[L[LS2o]o]/f[all]| < 2.0 \quad (G6)$$

In the expression, r[L[LS2o]o] is a curvature radius of the object-side surface of the lens L[LS2o], and f[all] is a composite focal length of a total system of the image pickup lens.

In the image pickup lens, it is preferable that a lens is connected to an image-side surface of the lens substrate in the lens block arranged at a closest position to the image side, and that an image-side surface of the lens is a concave surface facing the image side and includes an inflection point In the image pickup lens, it is preferable that a third lens block is disposed at the image side of the second lens block, and that the image pickup lens satisfies the following expression (G7).

$$2.0 < f[BK3]/f[all] < 15.0 \quad (G7)$$

In the expression, f[BK3] is a composite focal length of the third lens block, and f[all] is a composite focal length of a total system of the image pickup lens.

In the image pickup lens, it is preferable that the total number of lens blocks in the image pickup lens is three.

In the image pickup lens, the first lens block preferably includes a first lens substrate and an aperture stop formed on one of an object-side surface or an image-side surface of the first substrate, for regulating an amount of light.

It is preferable that the image pickup lens further comprises an aperture stop for regulating an amount of light, arranged at the object side or the image side of the first lens block.

In the image pickup lens, all of the lens substrates are parallel flat plates with the same thickness.

In the image pickup lens, each of the lens substrates is preferably formed of a glass material.

In the image pickup lens, each of the lens or lenses is preferably formed of a resin material.

In the image pickup lens, inorganic microparticles which are 30 nm or less in size are preferably dispersed in the resin material forming the lens or lenses.

It is preferable that the resin material is a curable resin.

An image pickup apparatus comprising the above image pickup lens; and an image pickup element for taking light passing through the image pickup lens, can be one embodiment of the present invention. A mobile terminal comprising the image pickup apparatus can be one embodiment of the present invention, too.

As a method for manufacturing the above image pickup lens, when it is assumed that a lens block unit is a unit including a plurality of the lens blocks which are arrayed, the method preferably comprises the following steps. Namely, the method for manufacturing the image pickup lens preferably comprises: a joining step of arranging a spacer on at least a part of peripheries of the lens blocks and of joining a plurality of lens block units together through the spacer; and a cutting step of cutting the joined lens block units along the spacer.

EFFECTS OF THE INVENTION

According to the present invention, a space between the second lens block and the image pickup element is elongated due to a power arrangement of the first lens block and the second lens block. Therefore, the third lens block working for an aberration correction can be disposed in the space, which enhances the function of the image pickup lens. Further, the image pickup lens satisfies the predetermined conditional expressions, thereby, the first lens block has a proper positive power. It controls an enlargement of sensitivity of manufacturing error of the image pickup lens. As a result, the sensitivity of the manufacturing error of the image pickup lens becomes small and an image pickup lens suitable for mass-production is achieved.

BRIEF DESCRIPTION OF DRAWINGS

FIGS. 9A, 9B, and 9C are diagrams of spherical aberration, astigmatism and distortion of the image pickup lens in Example 1, respectively.

FIGS. 10A, 11B, and 11C are diagrams of spherical aberration, astigmatism and distortion of the image pickup lens in Example 2, respectively.

FIGS. 11A, 11B, and 11C are diagrams of spherical aberration, astigmatism and distortion of the image pickup lens in Example 3, respectively.

FIGS. 12A, 12B, and 12C are diagrams of spherical aberration, astigmatism and distortion of the image pickup lens in Example 4, respectively.

FIGS. 13A, 13B, and 13C are diagrams of spherical aberration, astigmatism and distortion of the image pickup lens in Example 5, respectively.

FIGS. 14A, 14B, and 14C are diagrams of spherical aberration, astigmatism and distortion of the image pickup lens in Example 6, respectively.

FIGS. 15A, 15B, and 15C are diagrams of spherical aberration, astigmatism and distortion of the image pickup lens in Example 7, respectively.

FIGS. 16A, 16B, and 16C are diagrams of spherical aberration, astigmatism and distortion of the image pickup lens in Example 8, respectively.

FIG. 18A is a cross sectional view of a lens block unit, FIG. 18B is a cross sectional view showing steps of manufacturing the image pickup lens, and FIG. 18C is a cross sectional view of the image pickup lens.

REFERENCE SIGNS LIST

Figure 1:
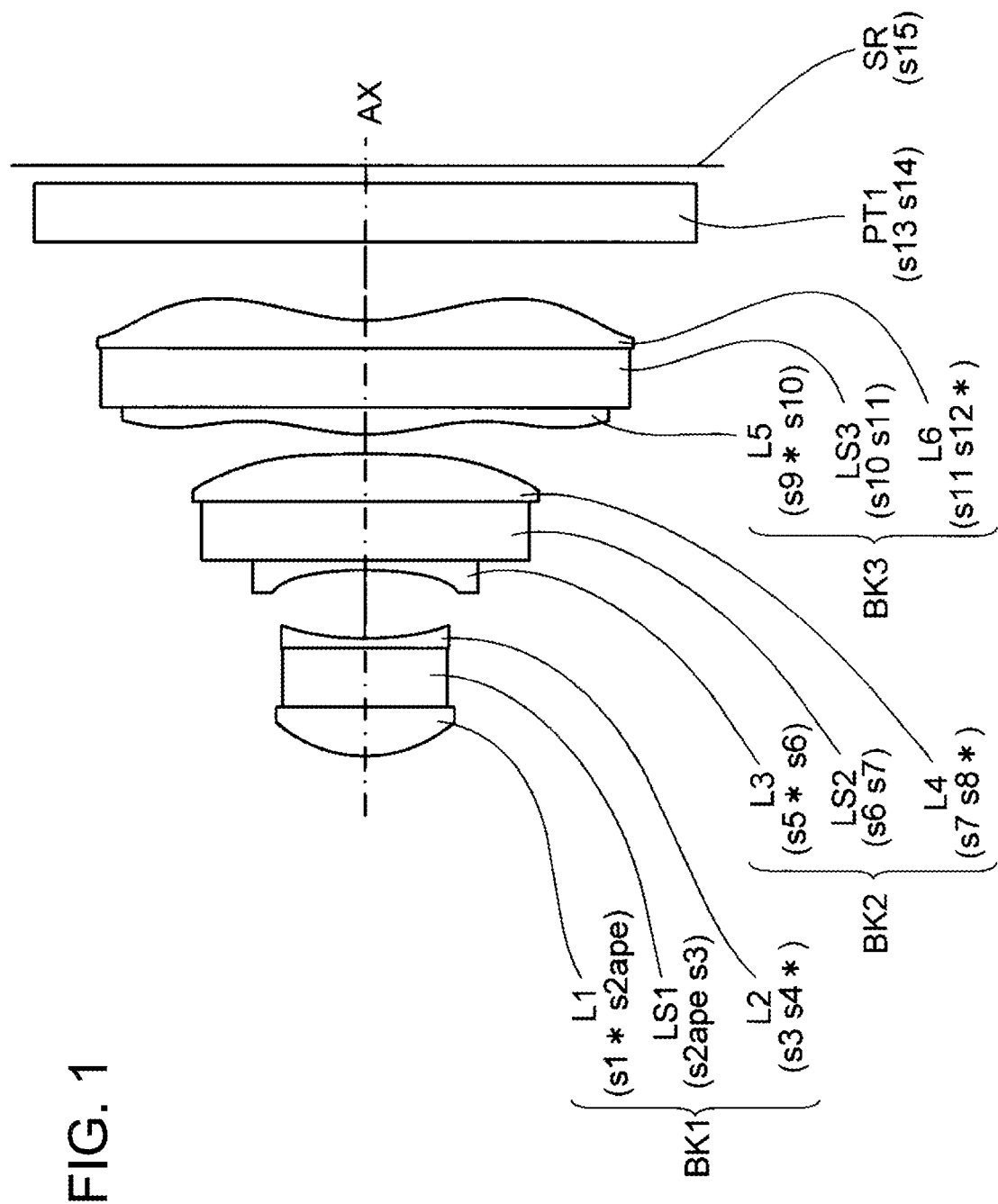
FIG. 1 is an optical cross-sectional view of the image pickup lens in Example 1.
Figure 2:
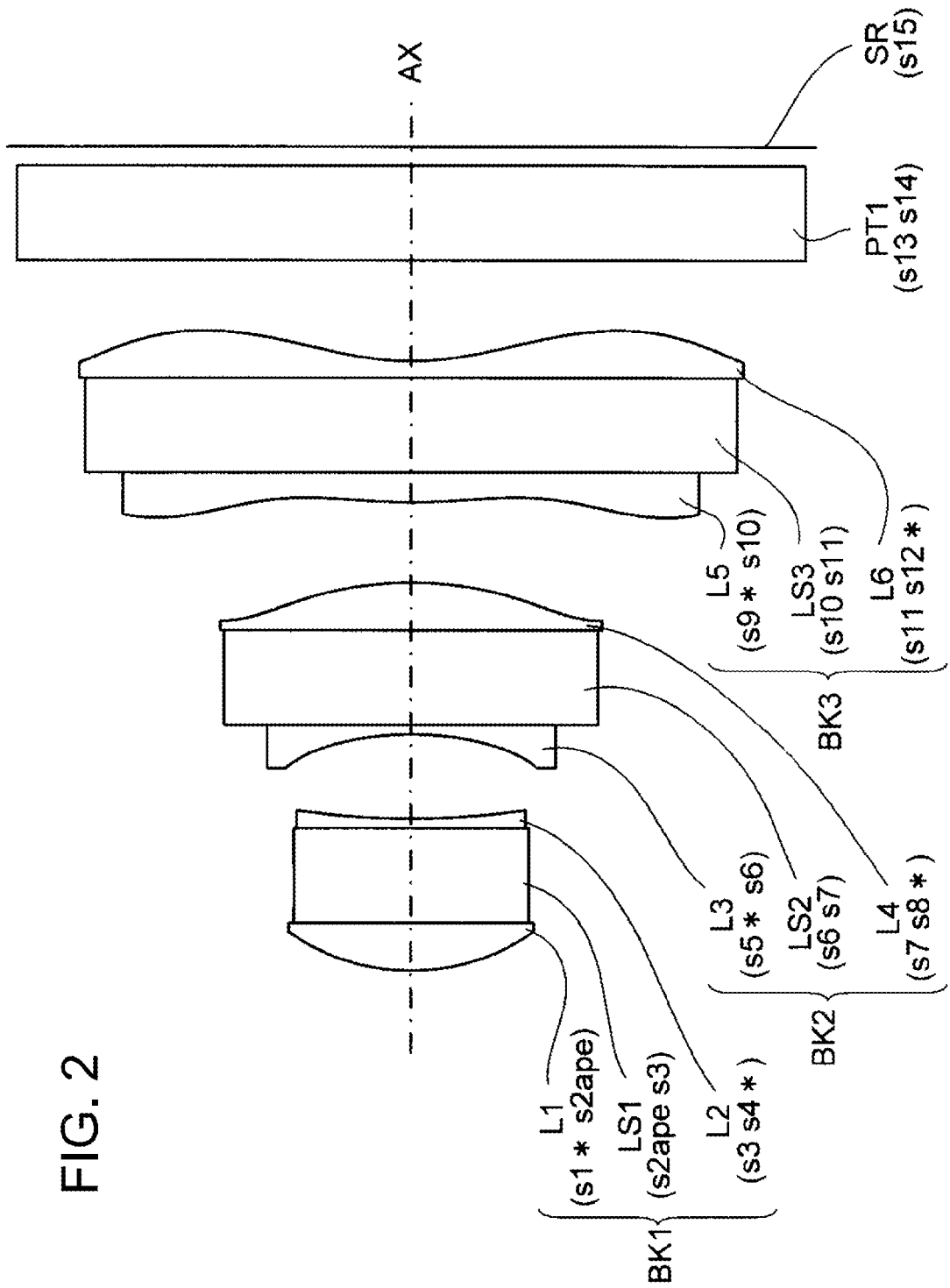
FIG. 2 is an optical cross-sectional view of the image pickup lens in Example 2.
Figure 3:
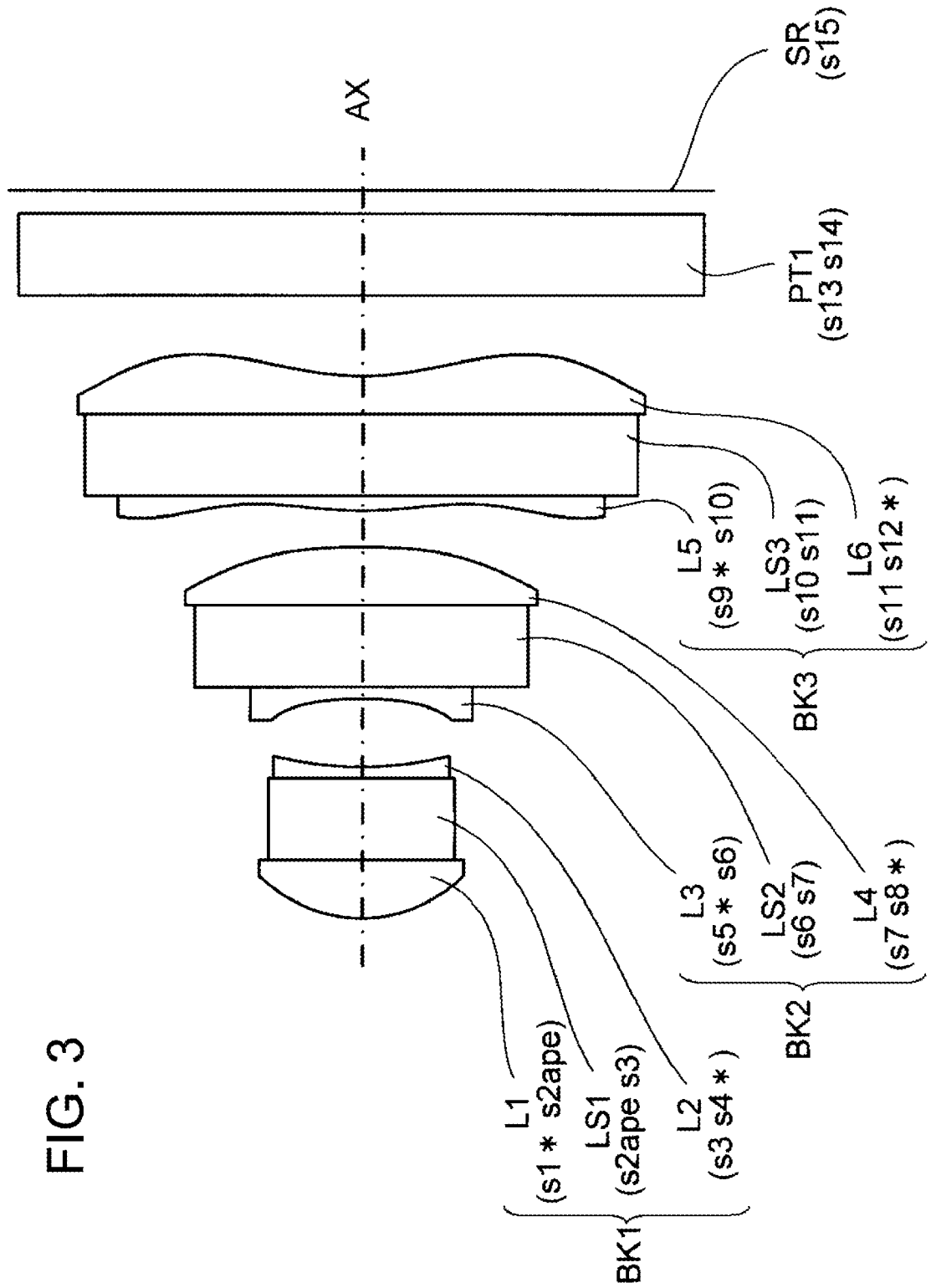
FIG. 3 is an optical cross-sectional view of the image pickup lens in Example 3.
Figure 4:
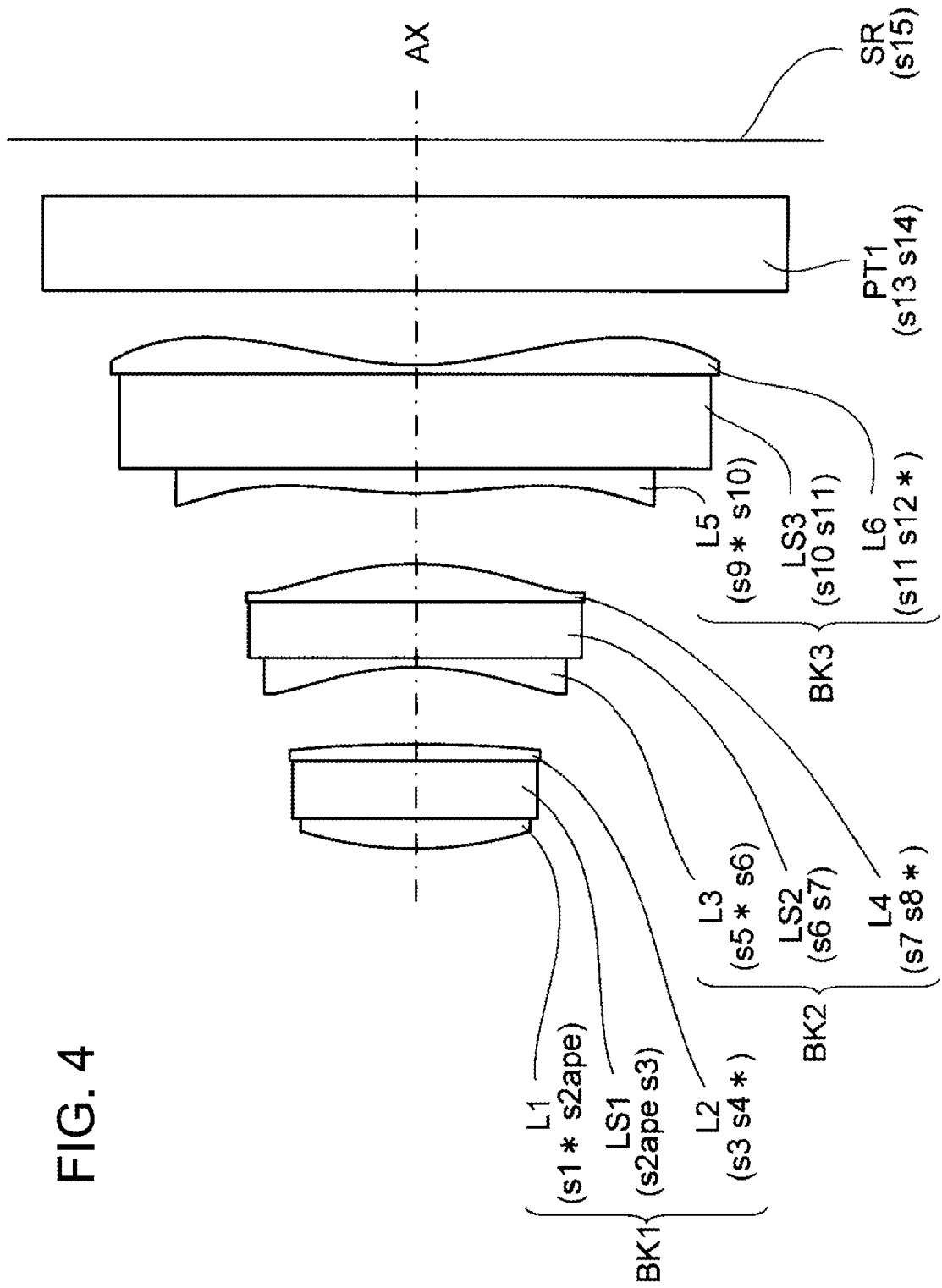
FIG. 4 is an optical cross-sectional view of the image pickup lens in Example 4.
Figure 5:
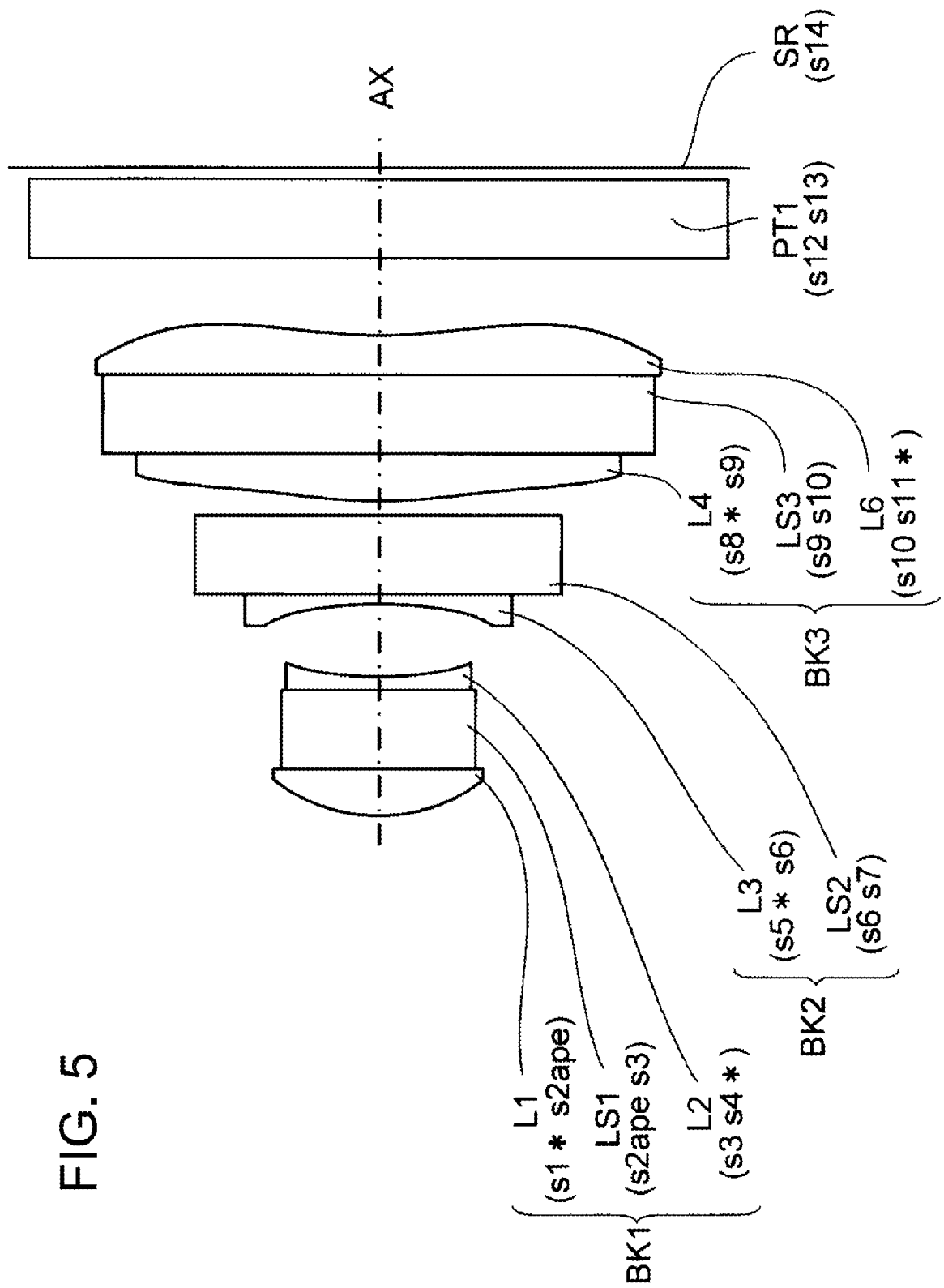
FIG. 5 is an optical cross-sectional view of the image pickup lens in Example 5.
Figure 6:
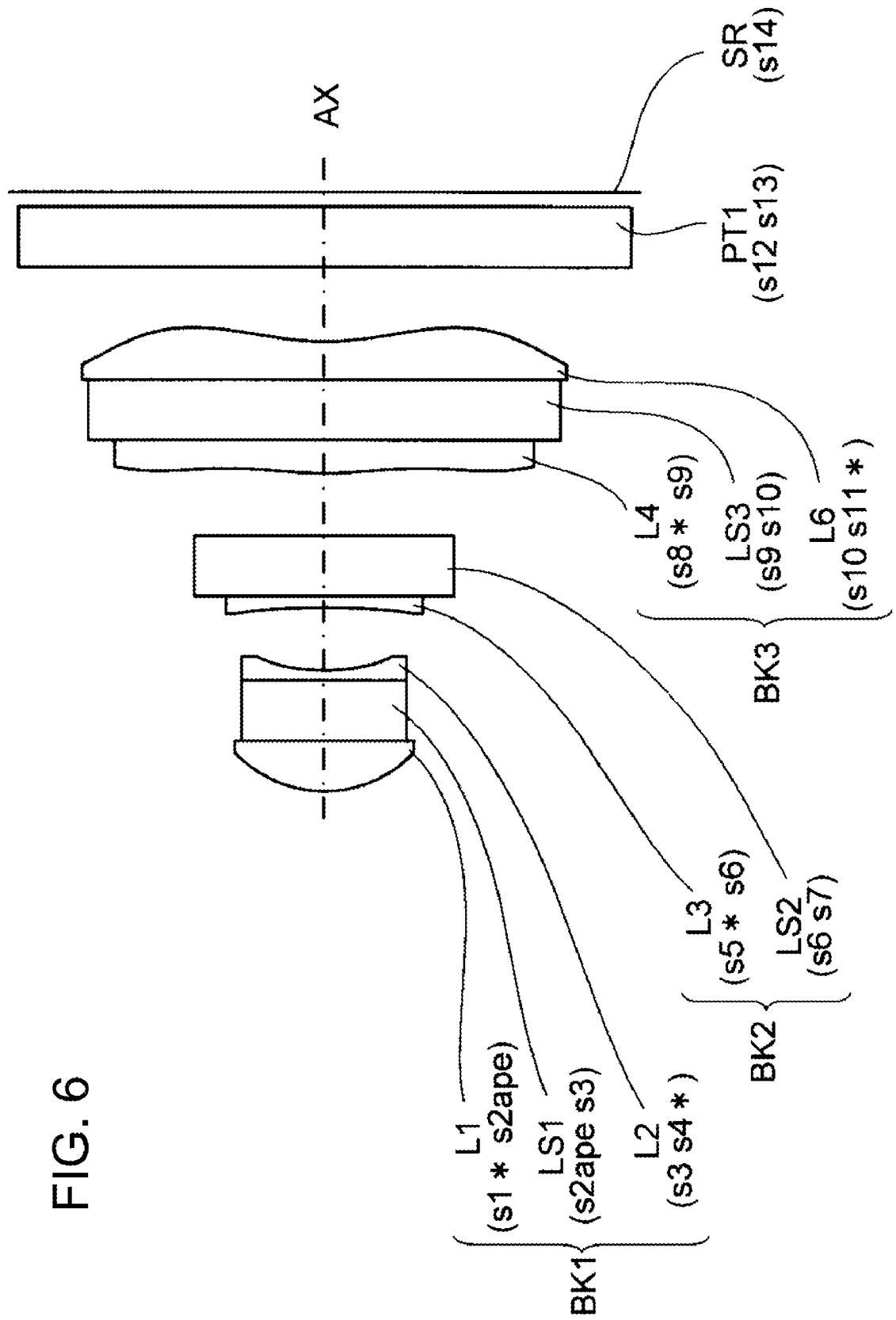
FIG. 6 is an optical cross-sectional view of the image pickup lens in Example 6.
Figure 7:
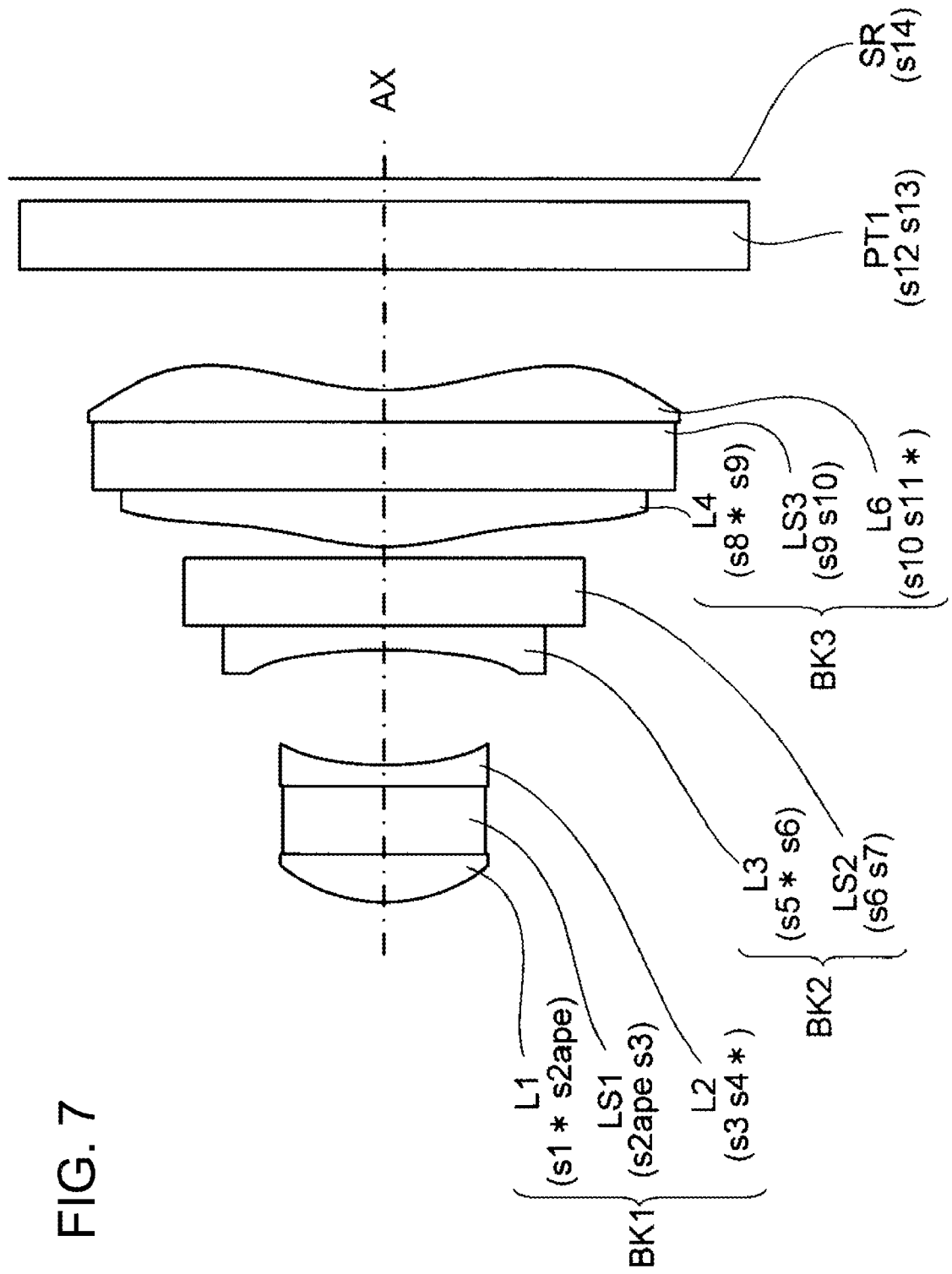
FIG. 7 is an optical cross-sectional view of the image pickup lens in Example 7.
Figure 8:
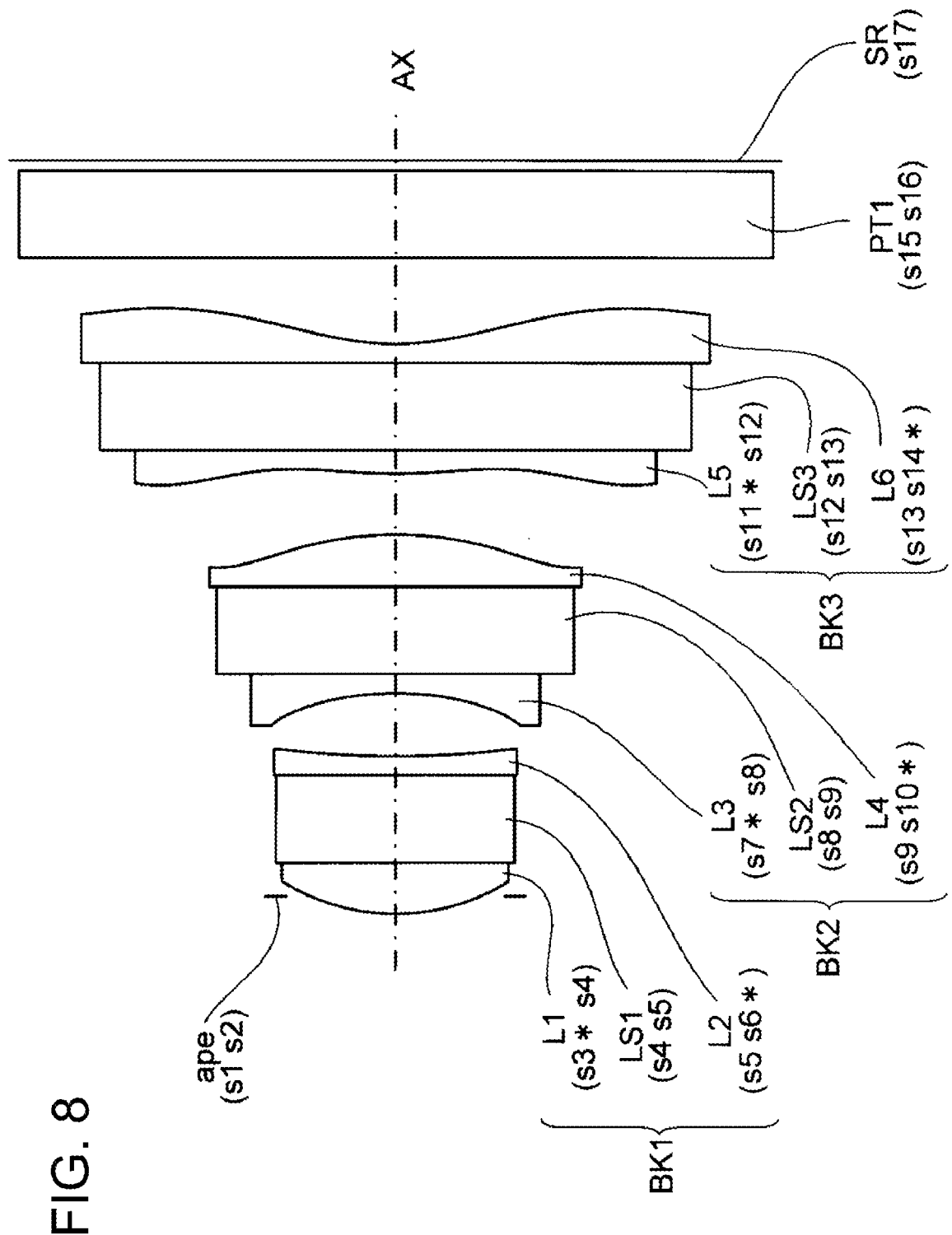
FIG. 8 is an optical cross-sectional view of the image pickup lens in Example 8.
Figure 11A:
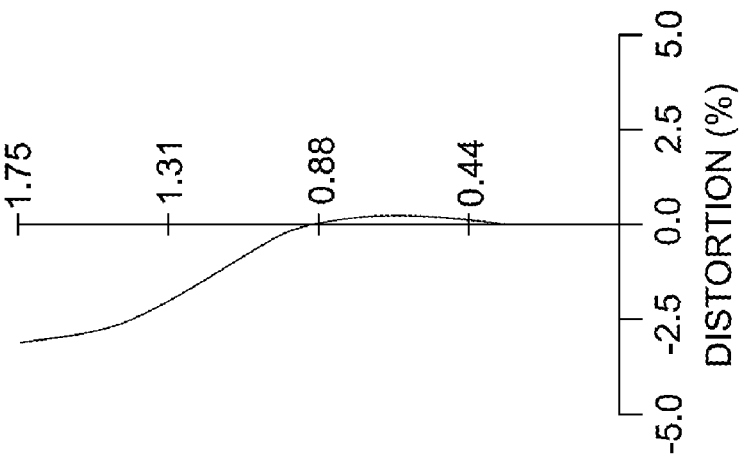
Figure 11B:
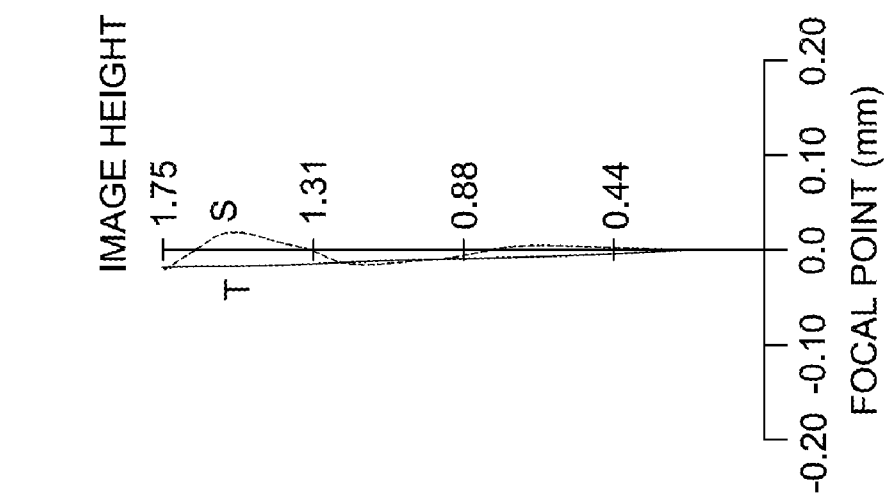
Figure 11C:
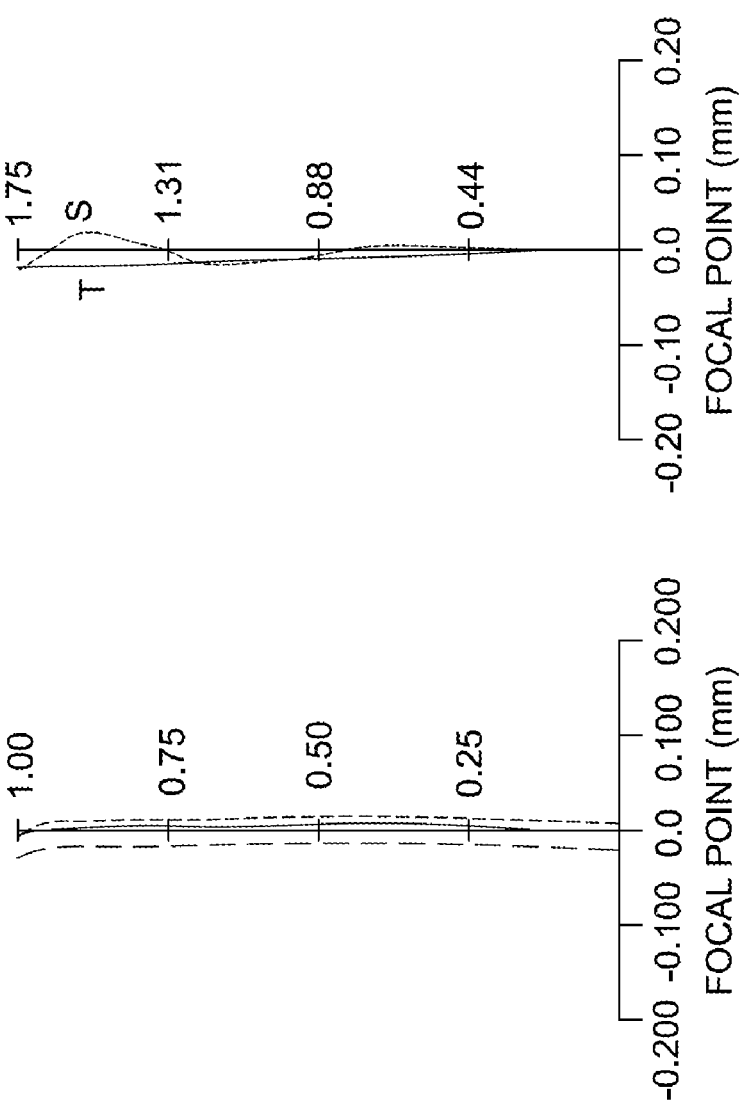

BK lens block
L lens
LS lens substrate
ape aperture stop
s lens surface, substrate surface
* aspheric surface
PT parallel flat plate
LN image pickup lens
SR image pickup element
IM Image plane
SS light-receiving surface
AX optical axis
LU image pickup apparatus
CU mobile terminal
1 signal processing section
2 controller
3 memory
4 operating section
5 display section

BEST MODE FOR CARRYING OUT THE INVENTION

Embodiment 1

[■ Image Pickup Apparatus and Mobile Terminal]

An image pickup lens is generally suitable to be used in a digital device (for example, a mobile terminal) with image input function. The reason is that a digital device including a combination of an image pickup lens and an image pickup element constitutes an image pickup apparatus which optically takes an image of a photographic subject therein and outputs it as electric signal.

An image pickup apparatus is a main component of a camera which shoots a still image and movie of a photographic subject. For example, an image pickup apparatus includes, in order from the object (namely, photographic subject) side, an image pickup lens for forming an optical image of an object, and image pickup element for converting the optical image formed by the image pickup lens into an electric signal.

As examples of a camera, there are given a digital camera, video camera, surveillance camera, onboard camera, and video telephone. A camera may be mounted in or attached externally on a device such as a personal computer, mobile terminal (for example, a compact and portable information terminal such as a cell phone and mobile computer), their peripheral device (such as a scanner and a printer), and other digital devices.

As can be seen from these examples, when an image pickup apparatus is mounted on a device, the image pickup apparatus can constitute not only a camera, but also various kinds of device with camera function. For example, a digital device with an image input function such as a cell phone with a camera, can be constituted.

Figure 17:
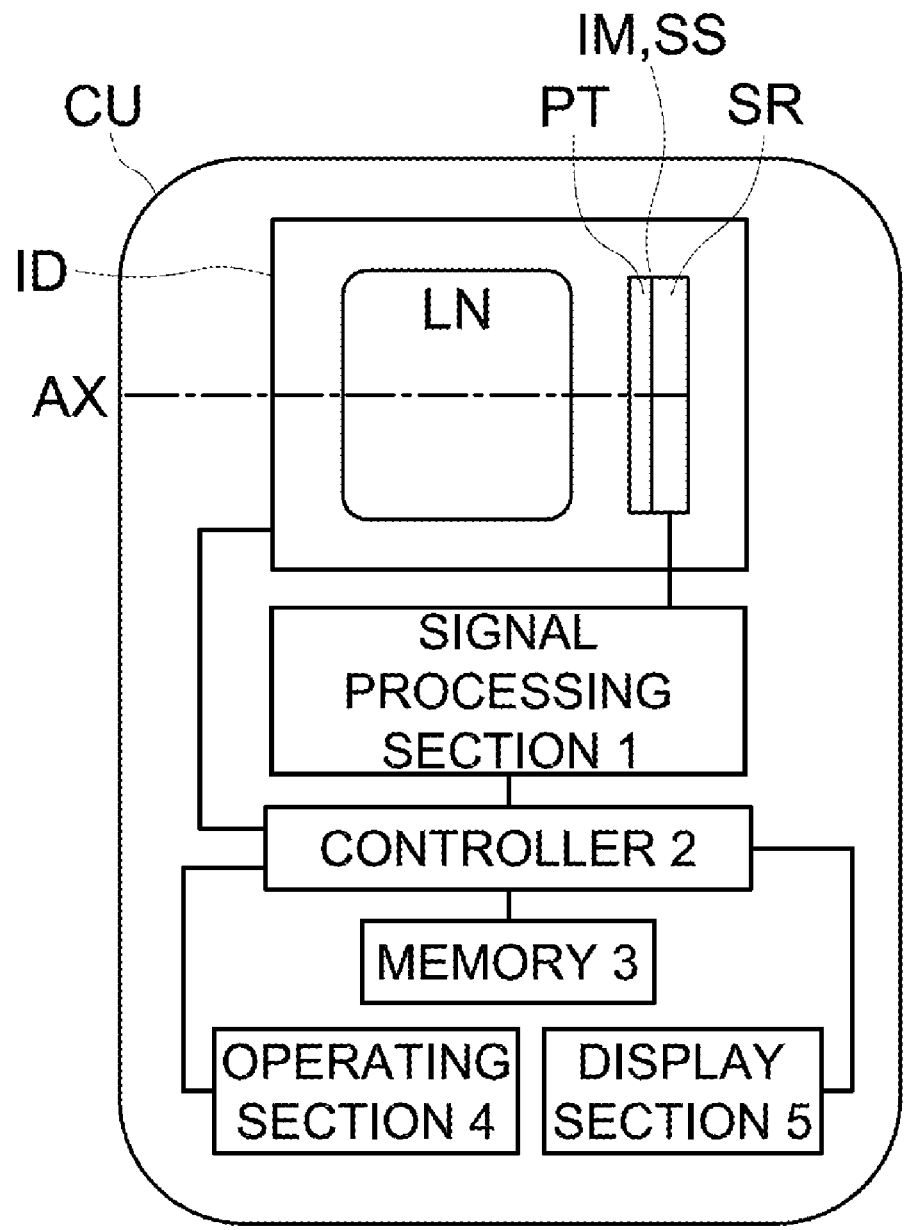
FIG. 17 is a control block diagram of a cell phone.

FIG. 17 is a block diagram of mobile terminal CU as an example of the digital device with an image input function. Image pickup apparatus LU mounted on mobile terminal CU in the FIG. includes image pickup lens LN, parallel flat plate PT, and image pickup element SR (where an element referred to as image pickup lens LN sometimes includes parallel flat plate PT).

Image pickup lens LN forms an optical image (image plane) IM of an object, in order from the object (namely, photographic subject) side. As it is described in detail, image pickup lens LN includes, for example, lens block BK (which will be descried in detail), and forms optical image IM on light-receiving surface SS of image pickup element SR.

Optical image IM to be formed by image pickup lens LN passes through, for example, an optical low-pass filter (parallel flat plate PT in FIG. 17) with a predetermined frequency-cutoff characteristic determined by pixel pitch of image pickup element SR. By the passing, the optical image is adjusted in terms of spatial frequency characteristic so as to minimize the so-called folding noise generated when an optical image is converted into an electric signal.

By the adjustment of the spatial frequency characteristic, generation of color moiré is reduced. However, when performance around the resolution-limit frequency can be controlled, noise is not generated even when an optical low-pass filter is not employed. Further, when a user shoots or observes an object with a display system in which noise is not so conspicuous (for example, a liquid crystal display of a cell phone), there is no need to use an optical low-pass filter.

Parallel flat plate PT is an optical filter such as an optical low-pass filter arranged at need, and an infrared-cut filter (where parallel flat plate PT sometimes corresponds to a cover glass of image pickup element SR).

Image pickup element SR converts optical image IM formed on light-receiving surface SS by image pickup lens LN into electric signal. As an example of an image pickup element (solid-state image pickup element), there are cited CCD (Charge Coupled Device) type image sensor or CMOS (Complementary Metal-Oxide Semiconductor), each having plural pixels. Image pickup lens LN is positioned to form an optical image IM of a photographic subject on light-receiving surface SS of image pickup element SR. Thereby, optical image IM formed by image pickup lens LN is efficiently converted into electric signal by image pickup element SR.

When such the image pickup apparatus LU is mounted on mobile terminal CU with an image input function, the image pickup apparatus LU is generally arranged inside the body of mobile terminal CU. When mobile terminal CU exhibits a camera function, image pickup apparatus LU is provided as an embodiment which suits the occasion. For example, image pickup apparatus LU which is unitized may be provided to be attachable to or removable from the body of mobile terminal CU or to be rotatable compared with the body of mobile terminal CU.

Mobile terminal CU further includes signal processing section 1, controller 2, memory 3, operating section 4, and display section 5 additionally to image pickup apparatus LU.

Signal processing section 1 adds a process such as predetermined digital image processing and image compression processing at need to signal generated in image pickup element SR. The processed signal is stored in memory 3 (such as a semiconductor memory and an optical disc) as digital image signal, or is converted into infrared signal through a cable to be transmitted to the other device.

Controller 2 is a microcomputer, and controls various functions including a photographing function and an image reproducing function, in other words, intensively carries out the control of a lens-moving mechanism for focusing operation. For example, controller 2 controls image pickup apparatus LU to carry out at least one of shooting a still image of the photographic subject and shooting a movie of the photographic subject.

Memory 3 stores, for example, signal which is generated in image pickup element SR and is processed in signal processing section 1.

Operating section 4 is a section including operating members such as an operation button (for example, a shutter release button) and an operation dial (for example, a shooting-mode dial), and transmits information which is inputted by operator's operation to control section 2.

Display section 5 is a section including a display such as a liquid crystal monitor, and displays images by using image signal converted by image pickup element SR or image information stored in memory 3.

[■ Image Pickup Lens]

Now, image pickup lens LN will be explained below. The image pickup lens LN includes lens block BK in which plural optical elements are arranged in a row (see FIG. 1 described later). In this lens block BK, a lens or lenses L are connected to, for example, at least one substrate surface of opposing surfaces (an object-side substrate surface and an image-side substrate surface) of lens substrate LS (wherein, the lens or lenses L have positive or negative power).

Meanwhile, the aforesaid expression saying "be connected to" means that the substrate surface of lens substrate LS and the lens or lenses L are in the state to be directly adhered together or, the substrate surface of lens substrate LS and the lens or lenses L are in the state to be indirect adhered together with another member interposing between them.

[■ Manufacturing Method for Image Pickup Lens]

Incidentally, lens block unit UT including arrayed plural lens blocks BK as shown in the cross-sectional view in FIG. 18A are manufactured by, for example, a reflow method or a replica method, where these methods can form many lenses L simultaneously at a low cost (meanwhile, the number of lens blocks BK included in lens block unit UT may either be a singular number or be a plural number).

In the reflow method, glass with low softening point is made to be a film on a glass substrate by CVD (Chemical Vapor Deposition) method. Then, the film of glass with low softening point is are subjected to micromachining through lithography and dry etching. When it is further heated, the film of glass with low softening point is melted to be in the state of a lens. In other words, many lenses are manufactured simultaneously on a glass substrate, in the reflow method.

Further, in the replica method, curable resin is formed into a lens shape onto a lens wafer with a mold by transferring process. Owing to this, many lenses are manufactured simultaneously on a lens wafer in the replica method.

Then, image pickup lenses LN are manufactured from lens block unit UT manufactured by the aforesaid methods. An example of a manufacturing process for image pickup lenses is shown in a schematic sectional view in FIG. 18B.

First lens block unit UT1 is composed of first lens substrate LS1 that is a parallel flat plate, plural first lenses L1 cemented on a plane on one side of the aforesaid first lens substrate LS1 and of plural second lenses L2 cemented on a plane on the other side of the aforesaid first lens substrate LS1.

Second lens block unit UT2 is composed of second lens substrate LS2 that is a parallel flat plate, plural third lenses L3 cemented on a plane on one side of the aforesaid first lens substrate LS2 and plural fourth lenses L4 cemented on a plane on the other side of the aforesaid second lens substrate LS2.

Grid-like spacer member (spacer) B1 interposes between the first lens block unit UT1 and the second lens block unit UT2 (specifically, is arranged between the first lens substrate LSI and the second lens substrate LS2) to keep the space between both lens block units UT1 and UT2 to be constant. Further, another spacer member B1 interposes between substrate 2 and second lens block unit 2 to keep the space between substrate 2 and lens block unit UT2 to be constant (in other words, the spacer member B1 can be called a two-step grid). And, each lens L is positioned at a portion of a grid hole of the spacer member B1.

Incidentally, substrate B2 is a sensor-chip-sized package in a wafer-level size, including a micro-lens array, or a parallel flat plate such as a sensor cover glass or an IR blocking filter (which corresponds to parallel flat plate PT in FIG. 17).

Then, when spacer members B1 interpose between first lens block unit UT1 and first lens block unit UT2 and between second lens unit UT2 and second substrate B2, lens substrates LS (first lens substrate LSI and second lens substrate LS2) are joined together to seal a space between the lens substrates.

Then, when the joined first lens substrate LS1, second lens substrate LS2, spacer member B1 and substrate 2 are cut along a grid frame (a position of broken lines Q) of spacer member B1, a plurality of image pickup lenses LN each being of a two-element structure can be obtained as shown in FIG. 18C.

When a member in which plural lens blocks BK (first lens block BK1 and second lens block BK2) are incorporated is cut off and image pickup lenses LN are manufactured as stated above, adjustment of lens spacing and partial assembling for each image pickup lens LN become unnecessary, which makes mass production of image pickup lenses LN possible.

In addition, spacer member B1 is in a form of a grid, which makes the spacer member B1 to be one serving as a mark in the occasion for cutting off image pickup lens LN from the member in which plural lens blocks BK are incorporated. Therefore, image pickup lens LN can be cut off easily from the member in which plural lens blocks BK are incorporated, which is not time-consuming. As a result, image pickup lenses can be mass-produced at a low cost.

Taking the foregoing into consideration, a method for manufacturing image pickup lenses LN includes a joining step of arranging a spacer member B1 on at least a part of peripheries of the lens blocks BK and of joining a plurality of lens block units UT together through the spacer member B1; and a cutting step of cutting the joined lens block units UT along the spacer member B1. This manufacturing method is suitable to mass production of inexpensive lens systems.

[■ Lens Construction of Image Pickup Lens]

Next, a lens construction of image pickup lens LN in each of Examples 1-8 representing the whole examples will be explained as follows, referring to optical cross-sectional diagrams of FIGS. 1-8.

Symbols of members in the optical sectional diagrams are as follows.

Li: Lens L
LSi: Lens substrate LS (lens substrate LS for each of all Examples is a parallel flat plate)
BKi: Lens block BK
PTi: Parallel flat plate (a symbol of PTi is given to only a parallel flat plate that is not connected to lens L)
si: Lens surface and substrate surface
i: Numeral which is given to "Li" and is an order from the object side to the image side
*: Aspheric surface (a lens surface that does not adjoin lens substrate LS and adjoins the air is an aspheric surface)
ape: Aperture stop
AX: Optical axis Incidentally, there is sometimes an occasion wherein lenses L which are given numerals agreeing with an order from the object side to the image side are expressed in another way. Specifically, there is an occasion wherein lens L[LS1$_o$], lens L[LS1$_m$], lens L[LS2$_o$], lens L[LS2$_m$], lens L[LS3$_o$] and lens L[LS3$_m$] are expressed in the meaning of lens L on the object side (o) and lens L on the image side (m) in the lens substrate LS (first lens substrate LS1-third lens substrate LS3).

EXAMPLE 1-EXAMPLE 3 (SEE FIG. 1-FIG. 3)

Each of the image pickup lenses LN in Examples 1-3 includes three lens blocks BK1-BK3 arranged in the direction from the object side to the image side, aperture stop ape and parallel flat plate PT1.

First lens block BK1 positioned to be closest to the object side includes first lens substrate LS1. First lens L1 (lens L[LS1o]) is connected to the object-side substrate surface of the first lens substrate LS1, and second lens L2 (lens L[LS1m]) is connected to the image-side substrate surface of the first lens substrate LS1. In the detailed explanation, the first lens L1 and the second lens L2 are as follows. Meanwhile, aperture stop ape is formed on a boundary surface between the first lens L1 and the first substrate LS1.

First lens L1: Planoconvex lens whose object-side surface is convex
Second lens L2: planoconcave lens whose image-side surface is concave Second lens block BK2 is located at the image side of the first lens block BK1, and it includes second lens substrate LS2. Third lens L3 (lens L[LS2o]) is connected to the object-side substrate surface of the second lens substrate LS2, and fourth lens L4 (lens L[LS2m]) is connected to the image-side substrate surface of the second lens substrate LS2. In the detailed explanation, the third lens L3 and the fourth lens L4 are as follows.

Third lens L3: Planoconcave lens whose object-side surface is concave
Second lens L2: Planoconvex lens whose image-side surface is convex Third lens block BK3 is located at the image side of the second lens block BK2, and it includes third lens substrate LS3. Fifth lens L5 (lens L[LS3 o]) is connected to the object-side substrate surface of the third lens substrate LS3 , and sixth lens L6 (lens L[LS3m]) is connected to the image-side substrate surface of the third lens substrate LS3. In the detailed explanation, the fifth lens L5 and the sixth lens L6 are as follows.

Fifth lens L5: Planoconvex lens whose object-side surface is convex
Sixth lens L6: Planoconcave lens whose image-side surface is concave In parallel flat plate PT1, each of the object-side surface and the image-side surface is made to be a plane. This parallel flat plate PT1 may protect an imaging surface (light-receiving surface) of image pickup element SR (in other words, the parallel flat plate PT1 may serve as a cover glass). Meanwhile, the parallel flat plate PT1 in examples from now on is the same as the parallel flat plate PT1 in the present Example 1.

EXAMPLE 4 (SEE FIG. 4)

Image pickup lens LN in Example 4 includes first lens block BK1-third lens block BK3, aperture stop ape and parallel flat plate PT1.

In the first lens block BK1, first lens L1 (lens L[LS1o]) connected to the object-side substrate surface of the first lens substrate LS1 and second lens L2 (lens L[LS1m]) connected to the image-side substrate surface are as follows. Incidentally, aperture stop ape is formed on a boundary surface between the first lens L1 and first lens substrate LS1.

First lens L1: Planoconvex lens whose object-side surface is convex
Second lens L2: Planoconvex lens whose image-side surface is convex In the second lens block BK2, third lens L3 (lens L[LS2o]) connected to the object-side substrate surface of second lens substrate LS2 and fourth lens L4 (lens L[LS2m]) connected to the image-side substrate surface are as follows.

Third lens L3: Planoconcave lens whose object-side surface is concave
Fourth lens L4: Planoconvex lens whose image-side surface is convex In the third lens block BK3, fifth lens L5 (lens L[LS3 o]) connected to the object-side substrate surface of third lens substrate LS3 and sixth lens L6 (lens L6 (lens L[LS3 m]) connected to the image-side substrate surface of third lens substrate LS3 are as follows.

Fifth lens L5: Planoconvex lens whose object-side surface is convex
Sixth lens 1-6: Planoconcave lens whose image-side surface is concave

EXAMPLE 5-EXAMPLE 7 (SEE FIG. 5-FIG. 7)

Each of image pickup lenses LN in Examples 5-7 includes first lens block BK1-third lens block BK3, aperture stop ape and parallel flat plate PT1.

In the first lens block BK1, first lens L1 (lens L[LS1o]) connected to the object-side substrate surface of the first lens substrate LS1 and second lens L2 (lens L[LS1m]) connected to the image-side substrate surface of the first lens substrate LS1 are as follows. Incidentally, aperture stop ape is formed on a boundary surface between the first lens L1 and the first lens substrate LS1.

First lens L1: Planoconvex lens whose object-side surface is convex
Second lens L2: Planoconcave lens whose image-side surface is concave Second lens block BK2 includes second lens substrate LS2, and lens L {third lens L3 (lens L[LS2o])} is connected only to the object-side substrate surface of the second lens substrate LS2. In the detailed explanation, the third lens L3 becomes to be as follows.

Third lens L3: Planoconcave lens whose object-side surface is concave

In the third lens block BK3, fourth lens L4 (lens L[LS3o]) connected to the object-side substrate surface of the third lens substrate LS3 and fifth lens L5 (lens L[LS3m]) connected to the image-side substrate surface become to be as follows.

Fourth lens L4: Planoconvex lens whose object-side surface is convex

Fifth lens L5: Planoconcave lens whose image-side surface is concave

EXAMPLE 8 (SEE FIG. 8)

Image pickup lens LN in Example 8 includes first lens block BK1-third lens block BK3, aperture stop ape and parallel flat plate PT1. In the image pickup lens LN of the present Example, the aperture stop ape is not included in the first lens block BK1. In the detailed explanation, the aperture stop ape is positioned at the object side of first lens block BK1 (the object-side surface of the aperture stop is represented by s1 and an image-side surface is represented by s2).

In the first lens block BK1, the first lens L1 (lens L[LS1o]) connected to the object-side substrate surface of the first lens substrate LS1 and second lens L2 (lens L[LS1m]) connected to the image-side substrate surface become to be as follows.

First lens L1: Planoconvex lens whose object-side surface is convex

Second lens L2: Planoconcave lens whose image-side surface is concave

Second lens block BK2 is positioned at the image side of the first lens block BK1, and includes second lens substrate LS2. Third lens L3 (lens L[LS2o]) is connected to the object-side substrate surface of the second lens substrate LS2, and fourth lens L4 (lens L[LS2m]) is connected to the image-side substrate surface of the second lens substrate LS2, In the detailed explanation, third lens L3 and fourth lens L4 become to be as follows.

Third lens L3: planoconcave lens whose object-side surface is concave

Fourth lens L4: planoconvex lens whose image-side surface is convex

Third lens block BK3 is positioned at the image side of the second lens block BK2, and includes third lens substrate LS3. And, fifth lens L5 (lens L[LS3o]) is connected to the object-side substrate surface of the third lens substrate LS3, and sixth lens L6 (lens L[LS3 m]) is connected to the image-side substrate surface of the third lens substrate LS3. In the detailed explanation, fifth lens L5 and sixth lens L6 become to be as follows.

Fifth lens L5: Planoconvex lens whose object-side surface is convex

Sixth lens L6: Planoconcave lens whose image-side surface is concave

[■ Lens data of image pickup lens]

Next, various types of data, construction data and aspheric surface data for image pickup lenses LN in Examples 1-8 will be shown as follows.

Meanwhile, symbols in various types of data are as follows.

f: Focal length [unit; mm]

Herein, f[all] represents a focal length of the total system of image pickup lenses LN, and each of f[BK1]-f[BK3] represents a focal length of each of the lens blocks BK1-BK3.

Fno: F number

ω: Half angle of view [unit; °] (where, a value of the angle of view includes distortion)

Y': Image height [unit; mm] (where, a value of the image height includes distortion)

TL: Total length of image pickup lens LN [unit; mm]

BF: Back focus (which is an air-converted length that also applies to a back focus included in an optical total length representing a total length of image pickup lenses LN)

Herein, the focal length of lens L connected to the object-side substrate surface of lens substrate LS is obtained under the condition that the object side of the lens L is filled with air, while, the image side thereof is filled with media of the lens substrate LS. Further, a focal length of lens of the lens connected to the image-side substrate surface of lens substrate LS is obtained under the condition that the object side of the lens L is filled with media of the lens substrate LS, while, the image side thereof is filled with air.

Further, a focal length for the object-side lens surface of lens L that is not connected to the substrate surface is obtained under the condition that the object side of the lens L is filled with air, while, the image side thereof is filled with media of the lens substrate LS. As a matter of course, a focal length for the image-side lens surface of the lens L that is not connected is obtained under the condition that the object side of the lens L is filled with media of the lens substrate LS, while, the image side thereof is filled with air.

Symbols in the construction data are shown as follows.

si: Numerals are in the order of the lens surfaces and substrate surfaces in the direction from the object side to the image side.

i: Numerals given to "si" which represent orders from the object side to the image side

*: Aspheric surface ape: Aperture stop r: Curvature radius of a lens surface or of a substrate surface [unit; mm]

d: Axial surface distance [unit; mm]

Nd: Refractive index of the media at d fine (wavelength 587.56 mm)

vd: Abbe number of the media at d line

Aspheric surface data are defined by the following expression (AS) employing the local Cartesian coordinate system (x,y,z) wherein a surface apex in the aspheric surface is at the origin. Following K and A of each aspheric surface (si) are shown (however, a term having no notation is zero). Incidentally, "e−n"="×10$^{-n}$" holds concerning all data $$z=(h^2/r)/(1+\sqrt{[1-(1+K)\cdot h^2/r^2]})+\Sigma A_j h^j \quad (AS)$$

In the aforesaid expression, h represents height ($h^2=x^2+y^2$) in the direction perpendicular to z axis (optical axis AX), z represents an amount of sag (measured from the standard at the surface apex) in the direction of optical axis AX in a position at height h, r represents a curvature radius, K represents the conic constant and $A_j$ represents $j^{th}$ order aspheric surface coefficient.

EXAMPLE 1 (SEE FIG. 9)

f[all] 2.647
f[BK1] 2.252
f[BK2] −4.572
f[BK3] 29.024
Fno 2.880
ω 34.111
Y' 1.750
TL 2.890
BF 0.675
si rd Nd vd
1* 0.811 0.250 1.52000 57.00
2 (ape) infinity 0.300 1.47400 56.40
3 infinity 0.050 1.55000 32.00
4* 2.075 0.346

5* −2.283 0.050 1.55000 32.00
6 infinity 0.300 1.47400 56.40
7 infinity 0.241 1.52000 57.00
8* −25.652 0.100
9* 1.312 0.137 1.52000 57.00
10 infinity 0.300 1.47400 56.40
11 infinity 0.141 1.55000 32.00
12* 1.289 0.399
13 infinity 0.300 1.51633 64.14
14 infinity 0.079
15 infinity
  s1*
    K=3.11773e−001
    A4=−1.11952e−001 A6=4.12697e−001 A8=−1.99639e+000
    A10=2.22217e+000 A12=0.00000e+000
  s4*
    K=9.03066e+000
    A4=1.67139e−001 A6=9.10089e−001 A8=5.35290e+000
    A10=1.18243e+001 A12=0.000000e000
  s5*
    K=1.75991e +001
    A4=1.57954e−001 A6=1.80218e+000 A8=3.70982e+000
    A10=4.16011e+000 A12=6.91572e+000
  s8*
    K=6.93862e+000
    A4=3.19503e−001 A6=9.94179e−002 A8 1.22816e−001
    A10=1.05558e−002 A12=−1.02995e−001
  s9*
    K=−1.08476e+000
    A4=−6.91146e−001 A6=4.07236e−001 A8=6.63633e−003
    A10=−6.23921e−002 A12=1.49033e−002
  s12*
    K=−6.06038e+000
    A4=−2.10718e−001 A6=7.31124e−002 A8=3.38434e−002
    A10=1.12053e−002 A12=7.11384e−004

EXAMPLE 2 (SEE FIG. 10)

f[all] 3.704
f[BK1] 3.003
f[BK2] −690.938
f[BK3] −5.985
Fno 2.880
ω 31.350
Y' 2.240
XL 4.124
BF 0.914
si r d Nd vd
1* 1.252 0.250 1.52000 57.00
2 (ape) infinity 0.500 1.47400 56.40
3 infinity 0.050 1.52000 57.00
4* 4.909 0.442
5* −1.885 0.050 1.52000 57.00
6 infinity 0.500 1.47400 56.40
7 infinity 0.250 1.52000 57.00
8* −2.175 0.424
9* 3.265 0.156 1.52000 57.00
10 infinity 0.500 1.47400 56.40
11 infinity 0.088 1.55000 32.00
12* 1.551 0.531
13 infinity 0.500 1.51633 64.14
14 infinity 0.054
15 infinity
  s1*
    K=3.05958e−001
    A4=130816e−002 A6=3.81369e−003 A8=7.05497e−003
    A10=1.52999e−002 A12=0.00000e+000
  s4*
    K=2.02241e+001
    A4=2.10611e−002 A6=1.71489e−001 A8=5.18291e−001
    A10=8.31280e−001 A12=0.00000e+000
  s5*
    K=5.15349e+000
    A4=1.464326e−003 A6=1.41202e−002 A8=3.20063e−001
    A10=3.56834e−001 A12=4.11694e−002
  s8*
    K=2.05378e+000
    A4=4.35175e−002 A6=8.80698e−002 A8=5.60302e−002
    A10=1.74354e−003 A12=1.20205e−002
  s9*
    K>3.24213e−002
    A4=2.92113e−001 A6=1.22510e−001 A8=3.35706e−003
    A10=7.41606e−003 A12=1.19605e−003
  s12*
    K=−6.34748e+000
    A4=−9.61452e−002 A6=2.67900e−002 A8=−6.67033e−003
    A10=8.92508e−004 A12=1.39287e−005

EXAMPLE 3 (SEE FIG. 11)

f[all] 2.753
f[BK1] 2.169
f[BK2] −6.443
f[BK3] −13.667
Fno 2.880
ω 33.086
Y' 1.750
TL 2.978
BF 0.653
si r d Nd vd
1* 0.807 0.250 1.52000 57.00
2 (ape) infinity 0.350 1.47400 56.40
3 infinity 0.050 1.55000 32.00
4* 2.163 0.290
5* −1.866 0.050 1.55000 32.00
6 infinity 0.350 1.47400 56.40
7 infinity 0.250 1.52000 57.00
8* −4.203 0.156
9* 2.063 0.066 1.52000 57.00
10 infinity 0.350 1.47400 56.40
11 infinity 0.162 1.55000 32.00
12* 1.527 0.345
13 infinity 0.350 1.51633 64.14
14 infinity 0.077
15 infinity
  s1*
    K>2.85078e−001
    A4=−8.77126e−002 A6=2.12975e−001 A8=−1.43963e+000
    A10=1.45839e+000 A12=0.00000e+000 s4*
  K=9.77741 e+000
  A4=2.54893e-002 A6=-6.10318e-001 A8=3.09263e+000
  A10=-1.83224e+001 A12=0.00000e-000
s5*
  K=1.42335e+001
  A4=-7.06514e-002 A6=-1.07883e+000 A8=1.08555e+000
  A10=-5.40220e+000 A12=3.07207e+000
s8*
  K=1.13365e+001
  A4=-2.69008e-001 A6=1.52602e-001 A8=6.12113e-002
  A10=-3.18793e-002 A12=-1.05795e-002
S9*
  K=2.03169e-001
  A4=-6.20108e-001 A6=4.03870e-001 A8=-1.66137e-002
  A10=-6.50318e-002 A12=1.71489e-002
s12*
  K=-6.91474e+000
  A4=-2.08104e-001 A6=8.20763e-002 A8=3.69054e-002
  A10=1.02771e-002 A12=3.69935e-004

EXAMPLE 4 (SEE FIG. 12)

f[all] 2.973
f[BK1] 2.487
f[BK2] -69.641
f[BK3] -8.465
Fno 2.880
ω 30.835
Y' 1.750
TL 3.573
BF 1.002
si r d Nd vd
1* 1.517 0.165 1.52000 57.00
2 (ape) infinity 0.300 1.51633 64.14
3 infinity 0.089 1.52000 57.00
4* -7.691 0.411
5* -1.239 0.050 1.55000 32.00
6 infinity 0.300 1.51633 64.14
7 infinity 0.200 1.52000 57.00
8* 1.405 0.375
9* 2.059 0.131 1.52000 57.00
10 infinity 0.500 1.51633 64.14
11 infinity 0.050 1.52000 57.00
12* 1.244 0.396
13 infinity 0.500 1.51633 64.14
14 infinity 0.277
15 infinity
  si*
    K=2.81651e+000
    A4=-1.64911e-001 A6=-3.50486e-002 A8=-4.00426e-001
    A10=1.08833e-001 A12=0.00000e+000
  s4*
    K=3.00000e+001
    A4=6.97529e-002 A6=6.73186e-003 A8=1.17936e-002
    A10=2.68305e-001 A12=0.00000e+000
  s5*
    K=-6.19072e+000
    A4=3.26269e-001 A6=6.84134e-001 A8=4.05781e-001
    A10=1.08216e+000 A12=6.22134e-001
  s8*
    K=2.99275e-001
    A4=-5.61372e-002 A6=4.73054e-001 A8=6.17604e-004
    A10=2.22352e-002 A12=8.31253e-002
  S9*
    K=1.95861e+001
    A4=-2.69021e-001 A6=1.30888e-001 A8=1.04330e-002
    A10=-6.07503e-002 A12=3.70017e-002
  s12*
    K=-6.46040e+000
    A4=1.50034e-001 A6=7.58932e-002 A8=-4.42902e-002
    A10=1.30184e-002 A12=-1.57213e-003

EXAMPLE 5 (SEE FIG. 13)

f[all] 2.890
f[BK1] 2.416
f[BK2] -4.455
f[BK3] 16.593
Fno 2.880
ω 30.894
Y' 30.894
TL 3.142
BF 0.702
si r d Nd vd
1* 0.882 0.237 1.52000 57.00
2 (ape) infinity 0.400 1.47400 56.40
3 infinity 0.068 1.52000 57.00
4* 2.141 0.368
5* -2.317 0.050 1.52000 57.00
6 infinity 0.400 1.47400 56.40
7 infinity 0.073
8* -2.224 0.241 1.52000 57.00
9* 0.400 1.47400 56.40
10 infinity 0.203 1.55000 32.00
11* infinity 2.754 0.389
12* 0.400 1.51633 64.14
13 infinity 0.050
14 infinity
  s1*
    K=2.87192e-001
    A4=5.84488e-002 A6=8.46640e-002 A8=3.91741e-001
    A10=1.64612e-001 A12=0.00000e+000
  s4*
    K=1.47848e+001
    A4=9.44161e-002 A6=-7.19604e-001 A8=3.19557e-000
    A10=9.42326e+000 A12=0.00000e+000
  s5*
    K=4.98195e+000
    A4=8.08230e-002 A6=-7.67275e-002 A8=2.85309e-001
    A10=8.15736e-002 A12=4.12767e-000
  s8*
    K=7.17765e-001
    A4=3.42193e-001 A6=2.61355e-001 A8=5.78269e-002
    A10=4.51000e-002 A12=2.25823e-002 s11*
    K=1.50135e-000
    A4=1.93316e-001  A6=5.19675e-002  A8=2.44293e-002
    A10=6.81970e-003 A12=-6.29114e-004

EXAMPLE 6 (SEE FIG. 14)

f[all] 2.774
f[BK1] 2.488
f[BK2] -10.446
f[BK3] -12.416
Fno 2.880
ω 32.365
Y' 1.750
TL 2.862
BF 0.637
si r d Nd vd
1* 0.769 0.249 1.52000 57.00
2 (ape) infinity 0.300 1.47400 56.40
3 infinity 0.050 1.52000 57.00
4* 1.381 0.309
5* -5.432 0.058 1.52000 57.00
6 infinity 0.300 1.47400 56.40
7 infinity 0.309
8* 2.325 0.163 1.52000 57.00
9 infinity 0.300 1.47400 56.40
10 infinity 0.187 1.55000 32.00
11* 1.634 0.369
12 infinity 0.300 1.51633 64.14
13 infinity 0.071
14 infinity
    s1*
        K=-3.64146e-003
        A4=9.17256e-003  A6=3.98044e-001  A8=1.38951e+000
        A10=3.23599e+000 A12=0.00000e+000
    s4*
        K=2.78669e+000
        A4=3.98580e-001  A6=9.94132e-002  A8=3.11542e+000
        A10=1.47065e+001 A12=0.00000e+000
    s5*
        K=1.66617e+001
        A4=1.79708e-001  A6=1.45136e+000  A8=1.24731e+000
        A10=1.62642e+001 A12=-1.90430e+001
    s8*
        K=-5.86554e+001
        A4=-2.72004e-001 A6=2.12991e-001  A8=2.47318e-002
        A10=6.88733e-002 A12=1.84259e-002
    s11*
        K=1.32049e+001
        A4=1.74896e-001  A6=3.55497e-002  A8 =1.27413e-002
        A10=6.44311e-003 A12=-1.43766e-004

EXAMPLE 7 (SEE FIG. 15)

f[all] 2.791
f[BK1] 2.662
f[BK2] -5.005
f[BK3] 8.560
Fno 2.880
ω 31.719
Y' 1.750
TL 3.063
BF 0.797
si r d Nd vd
1* 0.904 0.213 1.52000 57.00
2 (ape) infinity 0.300 1.47400 56.40
3 infinity 0.094 1.52000 57.00
4* 1.999 0.509
5* -2.602 0.106 1.52000 57.00
6 infinity 0.300 1.47400 56.40
7 infinity 0.050
8* 1.330 0.250 1.52000 57.00
9 infinity 0.300 1.47400 56.40
10 infinity 0.143 1.52000 57.00
11* 1.554 0.534
12 infinity 0.300 1.51633 64.14
13 infinity 0.065
14 infinity
    s1*
        K=-2.98845e-002
        A4=-1.99708e-002 A6=5.25030e-001  A8=-1.79489e+000
        A10=2.88669e+000 A12=0.00000e+000
    s4*
        K=1.02673e-001
        A4=2.47354e-001  A6=4.91375e-001  A8=-2.01725e+000
        A10=8.23800e+000 A12=0.00000e+000
    s5*
        K=7.26107e+000
        A4=3.30855e-001  A6=-2.12706e-001 A8=-3.78928e+000
        A10=9.73375e+000 A12=-9.11121e+000
    s8*
        K=-6.24169e+000
        A4=-3.14524e-001 A6=1.88800e-001  A8=2.98153e-002
        A10=5.92137e-002 A12=1.50063e-002
    s11*
        K=-5.65527e+000
        A4=-1.59751e-001 A6=3.09534e-002  A8=-1.55644e-002
        A10=5.97253e-003 A12=-2.95185e-004

EXAMPLE 8 (SEE FIG. 16)

f[all] 3.590
f[BK1] 2.906
f[BK2] -691.105
f[BK3] -6.318
Fno 2.880
ω 30.388
Y' 2.240
TL 4.048
BF 0.880
si r d Nd vd
1 (ape) infinity 0.050
2 infinity-0.150
3*1.286 0.291 1.52000 57.00
4 infinity 0.500 1.47400 56.40
5 infinity 0.110 1.52000 57.00
6*6.524 0.362
7*-1.904 0.110 1.5200057.00
8 infinity 0.500 1.47400 56.40
9 infinity 0.299 1.52000 57.00
10*-2.232 0.351
11*3.195 0.135 1.5200057.00

12 infinity 0.5001.47400 56.40
13 infinity 0.110 1.55000 32.00
14*1.5740.491
15 infinity 0.500 1.51633 64.14
16 infinity 0.059
17 infinity
  s3*
    K= 3.20296e−001
    A4=8.97949*003  A6=9.89952e−003  A8=8.90108e−003
    A10=1.84459e−002 A12=0.00000e+000
  S6*
    K=2.66973e+001
    A4=2.78145e−002 A6=1.37093e−001 A8=5.60951e−001
    A10=7.99838e−001 A12=0.00000e+000
  S7*
    K=5.01531+000
    A4=1.52192e−002 A6=1.07159e−002 A8=3.55772e−001
    A10=3.57875e−001 A12=4.11694e−002
  S10*
    K=1.94675e+000
    A4=4.18269e−002 A6=8.65809e−002 A8=5.23893e−002
    A10=1.34577e−004 A12=1.16270e−002
  s 11*
    K=1.53342e−001
    A4=2.91638e−001 A6=1.22743e−001 A8=3.31126e−003
    A10−7.41786e−003 A12−1.18997e−003
  s14*
    K=5.66679e+000
    A4=8.50750e−002 A6=2.80878e−002 A8=6.64778e−003
    A10=8.66315e−004 A12=2.57527e−005

[■ Aberrations of Image Pickup Lens]

Aberrations of image pickup lenses LN in Examples 1-8, as the whole examples, are shown in FIGS. 9A to FIG. 16C. The aberration diagrams show spherical aberration (LONGITUDINAL SPHERICAL ABERRATION), astigmatism (ASTIGMATIC FIELD CURVES), and distortion (DISTORTION).

In the spherical aberration diagram, each of an amount of spherical aberration at d line (wavelength 587.56 nm), an amount of spherical aberration at C line (wavelength 656.28 nm) and an amount of spherical aberration at g line (wavelength 435.84 nm) is indicated by a deviating amount [unit; mm] from a paraxial image surface in the direction of optical axis AX. The ordinate in the diagram of spherical aberration shows a value (namely, a relative pupil height) wherein a height of entering ray in a pupil is standardized with a maximum height. For types of lines showing d line, C line and g line, each diagram is to be referred.

The astigmatism diagram shows a tangential image plane at d line and a sagittal image plane at d line with a deviating amount [unit; mm] from paraxial image surface in the direction of optical axis AX. Incidentally, a line that is given a symbol of "T" corresponds to a tangential image plane, while, a line that is given a symbol of "S" corresponds to a sagittal image plane. Further, the ordinate in the astigmatism diagram represents an image height (IMG HT) [unit, mm].

In the distortion diagram, the abscissa shows a distortion [unit; %] at d line and the ordinate shows an image height [unit; mm]. Incidentally, the image height corresponds to maximum image height Y' on an image forming surface (a half of a diagonal of a light-receiving surface SS of image pickup element SR).

[■ Image Pickup Lens in Detail]

Details of the aforesaid image pickup lens LN are as follows.

Image pickup lens LN includes lens block BK. The lens blocks BK are mass-produced at a low cost as is stated earlier. In this mass production, the lens block BK includes lens L and lens substrate LS which are formed of different materials in order to increase options of materials, for example, to enable the selection of materials for easy processing or for inexpensive cost (in order to manufacture image pickup lenses LN simply at a low cost).

Further, when taking the balance for compactness, high performance (for example, high function for aberration correction) and a low cost into consideration, image pickup lens LN needs to include three or more lens blocks BK.

In addition, image pickup lenses LN are manufactured with the following steps as shown in FIG. 18B and FIG. 18C. Lens block units UT in which plural molded lenses L are arrayed on lens substrate LS, and substrate B2 which can be a sensor cover are joined together through spacer members B1. Then, the joined members are cut along the spacer members B1 to manufacture the image pickup lenses.

Accordingly, if lens substrate LS is a parallel flat plate, processing for lens substrate LS becomes to be simple or to be unnecessary in the manufacturing course for image pickup lenses LN. In addition, the processing becomes to be stable, because lenses L are formed on the substrate plane. Therefore, lens substrate LS being a parallel flat plate in shape lightens loads of manufacturing of image pickup lenses LN.

Further, when lens substrate LS is a parallel flat plate, a boundary surface between the substrate surface and lens L has no power. Therefore, the surface accuracy on the substrate surface of lens substrate LS, for example, hardly affects a focus position on an image plane of image pickup lens LN. Accordingly, the image pickup lens LN has high performance.

In particular, if all parallel flat plates to be lens substrates LS have the same thickness, conditions for grinding lens substrates LS are the same in the manufacturing course for image pickup lenses LN, which makes it possible to mass-produce lens substrates LS at a low cost, resulting in cost reduction of image pickup lens LN.

Further, in the image pickup lens LN, the first lens block BK1 has positive power, and the second lens block BK2 has negative power.

Under this condition, longitudinal chromatic aberration caused by positive power of the first lens block BK1 is corrected effectively by negative power of the second lens block BK2.

In addition, a space from the second lens block BK2 to image pickup element SR in the case where power arrangement of lens blocks BK1 and BK2 is "positive and negative" is elongated, compared with a space from the second lens block BK2 to image pickup element SR in the case where power arrangement of lens blocks BK1 and BK2 is "positive and positive". Therefore, another lens block that carries out correction of aberration (namely, third lens block BK3) can be arranged easily in the space between the second lens block BK2 and image pickup element SR.

Then, a beam that has passed through the first lens block BK1 and the second lens block BK2 travels while being away from the optical axis and being separated at every image heights, to reach the third leas block BK3. Then, the third lens block BK3 corrects aberrations for each separated light flux.

Thus, aberrations (distortion and others) are corrected effectively in image pickup lens LN. Further, if the distortion is corrected effectively by the third lens block BK3, the third lens block BK3 is capable of sharing a function for securing telecentricity.

Further, in image pickup lens LN, the following conditional expression (G1) is satisfied. This conditional expression (G1) prescribes the composite focal length (focal length) of the first lens block BK1 with a composite focal length of the whole (total system of) image pickup lens LN.

$$0.7 < f[BK1]/f[all] < 1.0 \tag{G1}$$

In the above expression, f[BK1] represents a composite focal length of the first lens block BK1 and f[all] represents a composite focal length of the whole image pickup lens LN.

When a value of the conditional expression (G1) is lower than the lower limit, a focal length of the first lens block BK1 is relatively short, which makes positive power of the first lens block BK1 to be powerful. Therefore, various aberrations caused by powerful positive power tend to be caused, although a total length of image pickup lens LN tends to be short.

Further, when the first lens block BK1 has powerful positive power, demands for superficial accuracy in the first lens block BK1 (for example, lens surface accuracy of lens L[LS1o], or lens surface accuracy of lens L[LS1m]) go up extremely, which makes manufacturing of image pickup lens LN to be difficult (namely, sensitivity for manufacturing errors for image pickup lens LN goes up). In addition, various aberrations tend to be caused even when the first lens block BK1 becomes to be eccentric.

On the other hand, when a value of the conditional expression (G1) exceeds an upper limit, a focal length of the first lens block BK1 is relatively long, which makes positive power of the first lens block BK1 to be small and weak. Therefore, the total length of image pickup lens LN tends to be long, although various aberrations caused by positive power are hardly generated.

The foregoing makes it to state that various aberrations can be controlled, sensitivity for manufacturing errors can be kept to be low and the total length can be kept to be relatively compact, all for the image pickup lens LN, if a value of the conditional expression (G1) is within a range from the lower limit to the upper limit. In other words, a decline of the sensitivity for manufacturing errors makes it possible to manufacture image pickup lenses LN in large quantities relatively simply and inexpensively (at a high yield rate, in a word), and still more, the image pickup lens LN thus manufactured has high performances (for example, high function for correcting aberration) in spite of its size that is relatively compact.

Further, in image pickup lens LN including lens L[LS1o] and lens L[LS1m], it is preferable that the following conditional expression (G2) is satisfied. This conditional expression (G2) prescribes a shape factor of the first lens block BK1.

$$1.0 < (r[L[LS1m]m] + r[L[LS1o]o])/(r[L[LS1m]m] - r[L[LS1o]o]) < 4.0 \tag{G2}$$

In the above expression, r[L[LS1m]m] represents a curvature radius of the image-side lens surface of lens L[LS1m] and r[L[LS1o]o] represents a curvature radius of the object-side lens surface of lens L[LS1o].

When a value of conditional expression (G2) is lower than the lower limit, it means that the object-side lens surface of lens L[LS1o] is a convex surface facing the object side, and image-side lens surface of lens L[LS1m] is a convex surface facing the image side. Under this condition, the so-called Petzval's sum is relatively great. Further, convex surfaces positioned on the both sides including the object side and the image side on the first lens block BK1 make correction of chromatic aberration to be difficult.

On the other hand, when a value of conditional expression (G2) exceeds the upper limit, a curvature radius of the image-side lens surface of lens [LS1m] becomes to be short excessively, and spherical aberration tends to be caused. Further, if the image-side lens surface of the lens [LS1m] is under this condition, off-axis aberrations (coma and astigmatism) also tend to be caused.

The foregoing makes it to state that the image-side lens surface of lens L[LS1m] becomes a concave surface facing the image side if a value of the conditional expression (G2) is within a range from the lower limit to the upper limit, and Petzval's sum becomes to be small relatively, together with the convex surface facing the object side on the object-side lens surface of lens L[LS1o]. Further, chromatic aberration is also corrected. Further, a curvature radius of the image-side lens surface of lens [LS1m] does not become short excessively, thus, spherical aberration and off-axis aberration are controlled. As a result, image pickup lens LN has high performances in spite of its size that is relatively compact.

Incidentally, in the first lens block BK1, it is preferable that at least a lens surface on one side among the object-side lens surface of lens L[LS1o] and the image-side lens surface of lens L[LS1m] is an aspheric surface. Under this condition, spherical aberration can be corrected efficiently because an aspheric surface is utilized.

Further, in the image pickup lens LN, it is preferable that the following conditional expression (G3) is satisfied. This conditional expression (G3) shows that Abbe number of lens L[LS1o] exceeds a fixed value.

$$40 < v[L[LS1o]] \tag{G3}$$

In the above expression, v[L[LS1o]] represents Abbe number of lens L[LS1o].

Abbe number is a value showing a dispersion of the material, and it is a ratio of a difference between a refractive index nF for blue light with wavelength 486.1 nm (F line) and a refractive index nC for red light with wavelength 656.3 nm (C line) to a difference between a refractive index for the yellow light with wavelength 587.6 nm (d line) and a refractive index of the air. A phenomenon that this Abbe number is great means that a difference (refractive index difference) between the refractive index at F line and the refractive index at C line is small.

Therefore, if the conditional expression (G3) is satisfied, even when, for example, a power of lens L[LS1o] is made to be relatively high for making the total length to be short and compact, longitudinal chromatic aberration caused by a difference in wavelength of light is controlled As a result, image pickup lens LN has high performances in spite of its size that is relatively compact.

In the range of conditions for the conditional expression (G3), it is preferable if conditional expression (G3a) that established the following range of conditions is satisfied.

$$50 < v[L[LS1o]] < 65 \tag{G3a}$$

Further, in image pickup lens LN, it is preferable if the image-side lens surface of lens L[LS1m] in the first lens block BK1 is a concave surface facing the image side and the following conditional expression (G4) is satisfied.

$$10 < v[L[LS1m]] < 40 \tag{G4}$$

In the above expression, v[L[LS1m]] represents Abbe number of lens L[LS1m].

If the condition is as stated above, longitudinal chromatic aberration which is not corrected completely by lens L[LS1o], for example, can be corrected by lens L[LS1m]. Therefore, image pickup lens LN has high performances.

Further, in image pickup lens LN, it is preferable if the following conditional expression (G5) is satisfied. This conditional expression (G5) is a ratio of the composite focal length of the first lens block BK1 to the composite focal length of the second lens block BK2 (which is a ratio in absolute values).

$$0.2<|f[BK1]/f[BK2]|<0.6 \quad (G5)$$

In the above expression, f[BK1] represents the composite focal length of the first lens block BK1, and f[BK2] represents the composite focal length of the second lens block BK2.

When a value of the conditional expression (G5) is lower than the lower limit, a focal length of the second lens block BK2, for example, becomes relatively longer, and power of the second lens block BK2 is weakened. In that case, it is difficult for the second lens block BK2 to correct various aberrations sufficiently (spherical aberration and curvature of field).

On the other hand, when a value of the conditional expression (G5) exceeds the upper limit, a focal length of the second lens block BK2 becomes to be shorter relatively, and power of the second lens block is strengthened. In that case, the second lens block BK2 of this kind may correct excessively various aberrations caused by positive power of the first lens block BK1.

Further, if the power of the second lens block BK2 is too strong, a distance from the second lens block BK2 to imaging element SR narrows. If that is the case, the lens block needs to be thin, because the third lens block BIG needs to be positioned in that narrow distance. Thus, manufacturing of the third lens block BK3 of that kind is difficult, which results in enhancement of sensitivity for manufacturing errors for image pickup lens LN (image pickup lens LN cannot have high function for correcting aberration, in a word), When third lens block BK3 is composed of a lens substrate and of a lens that is connected to the substrate surface, a space for lenses to be provided becomes a big problem, because a thickness of a lens becomes thicker than that of an ordinary lens. The conditional expression (G5) is one that is derived by considering a thickness of a lens block composed of a lens substrate and of a lens connected to the substrate surface.

The foregoing makes it to state that various aberrations can be corrected properly in image pickup lens LN, and the third lens block BK3 does not become to be too thin excessively, and sensitivity for manufacturing errors for image pickup lens LN becomes to be low, if a value of the conditional expression (G5) is within a range from the lower limit to the upper limit In other words, image pickup lenses LN in large quantities are manufactured relatively simply and inexpensively, and the image pickup lens LN thus manufactured has high performances in spite of its size that is relatively compact.

In image pickup lens LN, it is preferable if the object-side lens surface of lens L[LS2o] is a concave surface facing the object side, and it is further preferable if the following conditional expression (G6) is satisfied. This conditional expression (G6) prescribes a curvature radius of the object-side lens surface of lens L[LS2o] with a composite focal length of the whole image pickup lens.

$$0.4<|r[L[LS2o]o]/f[\text{all}]|<2.0 \quad (G6)$$

In the aforesaid expression, r[L[LS2o]o] represents a curvature radius of the object-side lens surface of lens L[LS2o], and f[all] represents the composite focal length of the whole image pickup lens LN.

When a value of the conditional expression (G6) is lower than the lower limit, a curvature radius of the object-side lens surface in lens L[LS2o] is too short, and manufacturing of the lens L[LS2o] becomes to be difficult. In addition, sensitivity for manufacturing errors for image pickup lens LN is also enhanced.

On the other hand, when a value of the conditional expression (G6) exceeds the upper limit, a curvature radius of the object-side lens surface is too long, and its lens L[LS2o] does not have sufficient power, and chromatic aberration cannot be corrected completely. Further, from the viewpoint of Petzval's sum, a focal length of the concave surface facing the object side in the object-side lens surface of lens L[LS2o] is too long, and a value of Petzval's sum hardly becomes zero, although a focal length of the convex surface facing the object side in the object-side lens surface of lens L[LS1o] and a focal length of the concave surface facing the object side in the object-side lens surface of lens L[LS2o], for example, become to be in relationship to offset each other.

From the foregoing, if the value of the conditional expression (G6) is in a range from the lower limit to the upper limit, Petzval's sum becomes small while securing the power needed for correction of chromatic aberration, in image pickup lens LN, and further, sensitivity for manufacturing errors for lens L[LS2o], is lowered (which also leads to the low sensitivity for manufacturing errors for image pickup lens LN). In other words, image pickup lens LN in large quantities are manufactured relatively simply and inexpensively, and the image pickup lens LN thus manufactured have high performances.

Incidentally, it is preferable if the conditional expression (G6a) that has established the following range of conditions among the range of conditions of the conditional expression (G6) is satisfied.

$$0.8<|r[L[LS2o]o]/f[\text{all}]|<2.0 \quad (G6a)$$

Further, in image pickup lens LN, it is preferable if lens L (lens L[LS2o]) is connected to only to the object-side substrate surface of the second lens substrate LS2 in the second lens block BK2.

Under this condition, the image-side surface of the second lens block BK2 becomes a flat plate of the image-side substrate surface of the second lens substrate LS2. Then, an influence to affect an optical image arriving at image pickup element SR due to the image-side surface that is a flat surface, is controlled, even when the second lens block BK2 is misaligned.

Further, as for the image pickup lens LN, it is preferable if the image-side lens surface of lens L connected to the image-side substrate surface of lens substrate LS is a concave surface facing the image side in lens block BK (for example, third lens block BK3) arranged at the closest position to the image side. In particular, it is preferable if the concave surface facing the image side has an inflection point within the lens surface.

As an example of a lens surface having thereon an inflection point, there is given a lens surface wherein a surface apex on that lens surface is made to be concave, and a portion where the principal ray at the maximum image height in the lens surface is made to be convex. Namely, a part of the lens surface in the vicinity of the point to intersect with a paraxial ray is made to be concave, and the periphery of the lens surface is made to be convex.

Such the lens surface in aspheric shape converges a light flux traveling and diverging toward a periphery of image pickup element SR. Therefore, in image pickup lens LN, the telecentricity is also secured while distortion is controlled.

Further, in the image pickup lens LN, it is preferable if the following conditional expression (G7) is satisfied. This conditional expression (G7) prescribes the composite focal length of the third lens block BK3 with the composite focal length of the total image pickup lens LN.

$$2.0 < f[BK3]/f[all] < 15.0 \quad (G7)$$

In the aforesaid expression, f[BK3] represents the composite focal length of the third lens block BK3, and f[all] represents the composite focal length of the whole image pickup lens LN, When a value of the conditional expression (G7) is lower than the lower limit, a focal length of the third lens block BK3 is short relatively, and power of the third lens block BK3 grows greater. Therefore, various types of aberrations tend to be caused due to the powerful power, though the total length of image pickup lens LN tends to be short.

Further, when the third lens block BK3 has powerful power, demands for the surface accuracy in the third lens block BK3 (for example, lens surface accuracy of lens L[LS3o] and lens surface accuracy of lens L[LS3m]) are enhanced extremely. Therefore, manufacturing of image pickup lens LN becomes difficult In addition, various types of aberrations tend to be caused even when the third lens block BK3 is misaligned.

Further, when power of the third lens block BK3 is too strong, a space from the third lens block BK3 to image sensor SR becomes to be narrow. In that case, for example, when the fourth lens block BK4 is positioned at the image side of the third lens block BK3, the fourth lens block BK4 is required to be positioned in the narrow space, thus, the fourth lens block BK4 is forced to be thin. Therefore, manufacturing of the fourth lens block BK4 of this kind is difficult resulting in enhanced sensitivity for manufacturing errors for image pickup lenses LN.

Further, when a cover glass (parallel flat plate) is mounted on image pickup element SR, the cover glass is to be positioned in the space from the third lens block BK3 to image pickup element SR. In that case, if the space from the third lens block BIG to image pickup element SR is confined, the cover glass needs to be thin excessively. Therefore, manufacturing of image pickup lens LN is difficult.

On the other hand, when a value of the conditional expression (G7) exceeds the upper limit, a focal length of the third lens block BK3 is relatively long, and power of the third lens block BK3 turns out to be small and weak. Therefore, a total length of the image pickup lens LN tends to be long, although various types of aberrations caused by the power tend not to be generated.

Based on the foregoing, if a value of the conditional expression (G7) is within a range from the lower limit to the upper limit, various types of aberrations are controlled, sensitivity for manufacturing errors is controlled, and further, the total length can be compact relatively, in image pickup lenses LN.

In addition, in image pickup lens LN, it is desirable that the following conditional expression (G8) is satisfied. This conditional expression (G8) prescribes a total sum of air distances between lens blocks BK with a total optical length of image pickup lenses LN.

$$Ar/TL < 0.4 \quad (G8)$$

In the aforesaid expression, TL represents a length from the surface arranged at the closest position to the object in image pickup lens LN to the imaging surface, and Ar represents the total sum of air distances of adjoining lens blocks BK in image pickup leas LN (in which, a thickness of an optical element with no power excluding lens block BK is included in the air distance after being converted in an air distance).

Compact image pickup lens LN that satisfies the conditional expression (G8) becomes a compact module (camera module) that is integrated with image pickup element SR. This camera module is attached on a printed board (circuit board) on which paste solder has been printed, and then, is subjected to heat treatment (reflow processing), to be mounted on the printed board.

In the course of reflow processing in the mounting process, the image pickup lens LN is kept under the environment around 300° C. (about 250-280° C.), upon which the air between lens blocks BK sealed up with spacer member B1 as shown in FIG. 18C expands. If the air expands excessively, lens blocks go away from the other and image pickup lens LN is liable to be damaged.

Therefore, it is desirable if the image pickup lens LN satisfies conditional expression (G8) to prevent damage of the image pickup lens LN of this kind. In other words, it is desirable that the air distance in image pickup lenses LN is as short as possible.

In image pickup lens LN, it is desirable that the following conditional expression (G9) is satisfied. This conditional expression (G9) is a ratio of a refractive index of the first lens substrate LS 1to a refractive index of lens L[LS1m], and it shows, in a word, that the refractive index of lens L[LD1m]is greater than the refractive index of the first lens substrate LS1.

$$N[LS1]/N[L[LS1m]] < 1 \quad (G9)$$

In the aforesaid expression, N[LS1] represents a refractive index of the first lens substrate LS1, and N[L[LS1m]] represents a refractive index of lens L[LS1m].

Under this condition, when light having passed through the first lens substrate LS1 enters lens L[LS1m], a total reflection is not caused. Therefore, there is no occurrence of ghost and flare which are caused by light (unwanted light) of the total reflection.

In particular, when light is reflected at a position that is relatively close to the object side, and the reflected light (unwanted light) arrives at image pickup element SR, the unwanted light is spread on the entire light-receiving surface of the image pickup element SR. The unwanted light of this kind is a cause for a decline of contrast on a taken image. However, if an occurrence of the unwanted light is controlled, the problem of this kind hardly takes place, and taken images exhibit high image quality.

By the way, the number of lens blocks included in the above-mentioned image pickup lens LN is not limited in particular. However, it is preferable mat three lens blocks BK in total are included in image pickup lens LN.

Under normal conditions, the more the number of lens blocks BK is, the more an optical axis of each lens block BK needs to be adjusted. Therefore, the more the number of lens blocks BK is, the more the manufacturing of image pickup lenses LN is complicated, which makes mass production to be difficult. However, the image pickup lens LN including three lens blocks BK can be mass-produced easily, compared with image pickup lens LN including four lens blocks BK, because a load of manufacturing for the image pickup lens LN including three lens blocks BK is small.

Further, in image pickup lens LN, it is preferable that aperture stop ape is formed on either one of the object-side substrate surface and the image-side substrate surface of the first lens substrate LS1.

When aperture stop ape is formed on a substrate surface of the first lens substrate LS1 in this way, it is usually positioned on the boundary between lens L (lens L[LS1o] or lens L[LS1m]) and lens substrate LS. Such the aperture stop ape formed on the boundary is formed through coating or through vacuum deposition processing.

In the image pickup lens LN, in that case, a space of exclusive use for aperture stop ape is made to be unnecessary. Further, when an IR (Infrared Rays) blocking coat or an AR (Anti-Reflection) coat is formed on the first lens substrate LS1 through vacuum deposition processing and others, aperture stop ape can be formed simultaneously. Accordingly, a load of manufacturing for image pickup lens LN is lightened.

Incidentally, when aperture stop ape is formed especially on the object-side substrate surface of the first lens substrate LS1, the aperture stop ape is positioned relatively close to the object in image pickup lens IN, thus, a position of an exit pupil leaves image pickup element SR. Thereby, telecentricity is secured, which is desirable for image pickup lens LN.

Further, in image pickup lens LN, it is desirable that aperture stop ape is positioned at the object side or the image side of the first lens block BK1.

If aperture stop ape is positioned at the object side or the image side of the first lens block BK1 (however, at the object side of the second lens block BK2), the aperture stop ape is positioned relatively close to the object in image pickup lens LN, thereby, a position of an exit pupil leaves image pickup element SR. Thereby, telecentricity is secured, which is desirable for image pickup lens LN.

Further, light that has passed through such the aperture stop travels while being away from the optical axis and being separated at every image heights by the power of the first lens block. Then, each of the second lens block BK2 and the third lens block BK3 corrects aberration for each separated light flux. Therefore, aberrations (distortion and others) are corrected effectively in image pickup lens LN. Namely, both of telecentricity and aberration correction are improved, if aperture stop ape is provided at a position that is away from image pickup element SR (image plane).

In particular, it is desirable that aperture stop ape is positioned at the object side of the first lens block BK1 (for example, see Example 8). Under this condition, aperture stop ape can be formed in one body together with a frame body of image pickup lens LN, which leads to cost reduction of image pickup lens LN.

Now, results of conditional expressions (G1-G9) in all Examples (Examples 1-8) are shown as follows. In the results, marks of "x" and of an underline mean that the conditional
expression is not satisfied,
EXAMPLES 1,2,3,4,5,6,7,8
(G1) 0.85, 0.81, 0.79, 0.84, 0.84, 0/90, 0.95, 0.81
(G2) 2.28, 1.68, 2.19, 0.67, 2.40, 3.51, 2.65, 1.49
(G3) 57.0, 57.0, 57.0, 57.0, 57.0, 57.0, 57.0, 57.0,
(G4) 32.0, x, 32.0, x, x, x, x, x
(G5) 0.49, x, 0.34, 0.04, 0.54, 0.24, 0.53, x
(G6) 0.86, 0.51, 0.68, 0.42, 0.80, 1.96, 0.72, 0.53
(G7) 10.96, −1.62, −4.96, −2.85, 5.74, −4.48, 3.07, −1.76
(G8) 0.15, 0.21, 0.15, 0.22, 0.14, 0.22, 0.20, 0.18
(G9) 0.948, 0.970, 0.948, 0.998, 0.970, 0.970, 0.970, 0.970

Embodiment 2

Embodiment 2 will be explained below. Meanwhile, members having the same functions of the members in Embodiment 1 are given the same symbols, and explanations for them are omitted. In the present embodiment, resin for forming lens L is explained.

Resin is excellent in workability. Therefore, when lenses L enumerated in Embodiment 1 are formed of resins, lens surfaces in aspheric shape can be formed in a simple way with a mold.

However, when fine particles are mixed in a transparent resin material (polymethylmethacrylate or the like), light scatters in the resin material and it causes lowered transmittance, usually. Therefore, resins containing fine particles are considered to be unsuitable for optical materials.

Further, refractive index of resin varies depending on a temperature. For example, temperature dependence for refractive index of polymethylmethacrylate, namely, a refractive index change (dn/dt) depending on a temperature will be obtained by the following Lorentz-Lorenz expression (LL) as follows.

[Numeral LL]

$$\frac{dn}{dt} = \frac{(n^2+2) \times (n^2-1)}{6n} \times \left\{ (-3\alpha) + \frac{1}{[R]} \times \frac{\partial [R]}{\partial t} \right\} \quad \text{(LL)}$$

In the expression above, n represents a refractive index of resin, t represents a temperature, a represents a coefficient of linear expansion (meanwhile, $\alpha = 7 \times 10^{-5}$ in the case of PMMA) and [R] represents molecular refraction.

In the case of PMMA, a refractive index change becomes "$-1.2 \times 10^{-4}$ [/°C]". This numerical value agrees nearly with actual measurements. Therefore, if lens L is formed of resin (plastic) alone, the refractive index change of the lens L has to depend on a temperature. In addition, if lens L is formed by mixing fine particles simply in such the resin, light scatters in the lens L, and the refractive index of the lens L varies depending on a temperature.

However, it has recently been understood that resin can be used as an optical material if the resin contains microparticles designed properly. The reason for the foregoing is that light does not scatter in the resin containing the microparticles (resin mixture) if a size of the fine particle is smaller than a wavelength of a transmitting light flux.

In addition, if the microparticles are inorganic microparticles, a refractive index of the inorganic microparticles rises depending on a temperature rise of the microparticles. In the resin mixture, therefore, a decline of the refractive index of resin caused by the temperature rise and a rise of the refractive index of the inorganic microparticles caused by the temperature rise take place simultaneously. In that case, both temperature-dependences (a decline of refractive index and a rise of refractive index) are cancelled each other, and a change of refractive index of resin mixture caused by a temperature hardly takes place as a result (for example, in lens L, a change of refractive index can be controlled on a level that is almost the same as the level of an influence on a paraxial image point position caused by a change of a surface form).

Incidentally, as a resin mixture representing an example of the foregoing, there is given a resin mixture wherein inorganic microparticles whose a maximum size is 30 nm or less {minor material; aluminum oxide ($Al_2O_3$), lithium niobate ($LiNbO_3$) and others} are dispersed in resin (base material).

When the foregoing is taken into consideration, if lens L is formed of the resin (resin mixture) in which inorganic microparticles whose size is 30 nm or less are dispersed, image pickup lens LN including lens L has high durability against temperatures. For example, when a ratio of resin to inorganic microparticles in resin mixture, a dimension of a particle size of an inorganic microparticles (for example, maximum size of 20 nm or less, more preferably, 15 nm or less), a type of resin serving as a base material and a type of inorganic microparticles serving as a minor material are adjusted properly, lens L has a high refractive index. In that case, if lens L is formed of the resin mixture, lens LN including the lens L becomes compact, and the level of difficulty for lens L is lowered.

Incidentally, it is preferable that the resin mentioned above is curable resin. The reason for this is that lens L including an aspheric surface can be manufactured simply by a mold, if the resin is a curable resin. Further, if the resin has adhesion properties (or, if adhesive exists in the resin), the lens L made of the aforesaid resin having the adhesion properties is easily joined to lens substrate LS, Namely, lens block BK block including lens substrate LS and lens L which are directly jointed together can be manufactured simply.

Further, it is preferable that the resin mentioned above has heat resistance. For example, a module (camera module) wherein image pickup lens LN and image pickup element SR are integrated into one body is attached on a printed board (circuit board) on which pasted solder is printed, then, heating processing (reflow possessing) is added to the module. Thereby, the module is mounted on the printed board. In particular, such the mounting process is carried out through automation. When lens L is made of heat resistant and curable resin, the lens L is suitable for the automation because the lens L can withstand tire reflow processing (it is naturally preferable, if lens substrate LS is also made of material having high heat resistance, for example, of material representing glass).

Meanwhile, as an example of the curable resin, there are given thermosetting resin and ultraviolet (UV) curable resin.

In the case of the thermosetting resin, even when lens L is thick relatively, it can be manufactured accurately. Further, in the case of UV curable resin, lens L can be manufactured in a short period of time, because the resin is hardened relatively in a short period of time.

Finally, the invention is not limited to the aforesaid embodiment, and the embodiment can be varied variously without departing from the spirit and scope of the invention.

This invention claimed is:

1. An image pickup lens comprising:
   at least three lens blocks each comprising
      a lens substrate being a parallel flat plate, and
      a lens or lenses, having a positive or negative power, being connected to at least one of an object-side surface and an image-side surface of the lens substrate,
   wherein the lens or lenses included in each of the lens blocks, is formed of a different material from the lens substrate,
   a first lens block which is one of the lens blocks arranged at a closest position to an object side, has a positive power,
   a second lens block which is another of the lens blocks arranged at an image side of the first lens block has a negative power, and
   the image pickup lens satisfies the following expression (G1):

$$0.7 < f[BK1]/f[all] < 1.0 \quad (G1)$$

where f[BK1] is a composite focal length of the first lens block, and
   f[all] is a composite focal length of a total system of the image pickup lens.

2. The image pickup lens of claim 1,
   wherein the first lens block includes
      a first lens substrate being the lens substrate,
      a lens L[LS1o] being one of the lenses, connected to an object-side surface of the first lens substrate, and
      a lens L[LS1m] being one of the lenses, connected to an image-side surface of the first lens substrate, and
   wherein the image pickup lens satisfies the following expression (G2):

$$1.0 < (r[L[LS1m]m] + r[L[LS1o]o])/(r[L[LS1m]m] - r[L[LS1o]o]) < 4.0 \quad (G2)$$

where r[L[LS1m]m] is a curvature radius of an image-side lens surface of the lens L[LS1m], and
   r[L[LS1o]o] is a curvature radius of an object-side surface of the lens L[LSb1o].

3. The image pickup lens of claim 1,
   wherein the first lens block includes
      a first lens substrate being the lens substrate, and
      a lens L[LSo] being one of the lens or lenses, connected to an object-side surface of the first lens substrate, and
   wherein the image pickup lens satisfies the following expression (G3):

$$40 < v[L[LS1o]o] \quad (G3)$$

where v[L[LS1o]o] is an Abbe number of the lens L[LS1o].

4. The image pickup lens of claim 1,
   wherein the image pickup lens satisfies the following expression (G5):

$$0.2 < |f[BK1]/f[BK2]| < 0.6 \quad (G5)$$

where f[BK1] is a composite focal length of the first lens block, and
   f[BK2] is a composite focal length of the second lens block.

5. The image pickup lens of claim 1,
   wherein the second lens block includes
      a second lens substrate being the lens substrate, and
      a lens L[LS2o] being one of the lens or lenses, connected to an object-side surface of the second lens substrate,
   wherein an object-side surface of the lens L[LS2o] is a concave surface facing the object side, and
   the image pickup lens satisfies the following expression (G6):

$$0.4 < |r[L[LS2o]o]/f[all]| < 2.0 \quad (G6)$$

where r[L[LS2o]o] is a curvature radius of the object-side surface of the lens L[LS2o], and
   f[all] is a composite focal length of a total system of the image pickup lens.

6. The image pickup lens of claim 1,
   wherein one of the lens or lenses is connected to an image-side surface of the lens substrate in one of the lens blocks arranged at a closest position to the image side, and
   an image-side surface of the one of the lens or lenses is a concave surface facing the image side and includes an inflection point.

7. The image pickup lens of claim 1,
   wherein a third lens block which is one of the lens blocks is disposed at the image side of the second lens block, and
   the image pickup lens satisfies the following expression (G7):

$$2.0 < f[BK3]/f[all] < 15.0 \quad (G7)$$

where f[BK3] is a composite focal length of the third lens block, and f[all] is a composite focal length of a total system of the image pickup lens.

8. The image pickup lens of claim 1, wherein the total number of lens blocks in the image pickup lens is three.

9. The image pickup lens of claim 1,
wherein the first lens block includes
a first lens substrate being the lens substrate, and
an aperture stop for regulating an amount of light, formed on one of an object-side surface or an image-side surface of the first substrate.

10. The image pickup lens of claim 1, further comprising an aperture stop for regulating an amount of light, arranged at the object side or the image side of the first lens block.

11. The image pickup lens of claim 1, wherein all of the lens substrates are parallel flat plates with the same thickness.

12. The image pickup lens of claim 1, wherein each of the lens substrates is formed of a glass material.

13. The image pickup lens of claim 1, wherein each of the lens or lenses is formed of a resin material.

14. The image pickup lens of claim 13, wherein inorganic microparticles which are 30 nm or less in size are dispersed in the resin material forming the lens or lenses.

15. The image pickup lens of claim 13, wherein the resin material is a curable resin.

16. An image pickup apparatus comprising:
the image pickup lens of claim 1; and
an image pickup element for taking light passing through the image pickup lens.

17. A mobile terminal comprising the image pickup apparatus of claim 16.

18. A method for manufacturing the image pickup lens of claim 1, the method comprising:
a joining step of arranging a spacer on at least a part of peripheries of the lens blocks and of joining a plurality of lens block units together through the spacer, where the lens block unit is a unit including a plurality of the lens blocks which are arrayed; and
a cutting step of cutting the joined lens block units along the spacer.

* * * * *